(12) United States Patent
Naito et al.

(10) Patent No.: US 11,078,374 B2
(45) Date of Patent: Aug. 3, 2021

(54) ACTIVE-ENERGY-RAY-CURABLE LIQUID COMPOSITION, THREE-DIMENSIONAL OBJECT FORMING MATERIAL SET, METHOD FOR PRODUCING THREE-DIMENSIONAL OBJECT, AND THREE-DIMENSIONAL OBJECT PRODUCING APPARATUS

(71) Applicant: RICOH COMPANY, LTD., Tokyo (JP)

(72) Inventors: Hiroyuki Naito, Tokyo (JP); Hiroshi Iwata, Tokyo (JP); Yoshihiro Norikane, Kanagawa (JP); Yoshihito Shimada, Kanagawa (JP); Kenji Sugiura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 211 days.

(21) Appl. No.: 16/308,709

(22) PCT Filed: Jun. 5, 2017

(86) PCT No.: PCT/JP2017/020866
§ 371 (c)(1),
(2) Date: Dec. 10, 2018

(87) PCT Pub. No.: WO2017/217273
PCT Pub. Date: Dec. 21, 2017

(65) Prior Publication Data
US 2019/0144692 A1   May 16, 2019

(30) Foreign Application Priority Data

Jun. 13, 2016 (JP) .............................. JP2016-117451
Jun. 13, 2016 (JP) .............................. JP2016-117455
Oct. 27, 2016 (JP) .............................. JP2016-210934
Dec. 13, 2016 (JP) .............................. JP2016-241638

(51) Int. Cl.
| | |
|---|---|
| *C08F 2/46* | (2006.01) |
| *C08F 2/50* | (2006.01) |
| *C08G 61/04* | (2006.01) |
| *C09D 11/101* | (2014.01) |
| *B33Y 70/00* | (2020.01) |
| *B33Y 10/00* | (2015.01) |
| *B33Y 30/00* | (2015.01) |
| *B29C 64/112* | (2017.01) |
| *C09D 11/30* | (2014.01) |
| *C08L 71/02* | (2006.01) |
| *B29C 64/124* | (2017.01) |
| *C09D 11/033* | (2014.01) |
| *C09D 11/107* | (2014.01) |
| *C09D 11/36* | (2014.01) |

(52) U.S. Cl.
CPC .......... *C09D 11/101* (2013.01); *B29C 64/112* (2017.08); *B29C 64/124* (2017.08); *B33Y 10/00* (2014.12); *B33Y 30/00* (2014.12); *B33Y 70/00* (2014.12); *C08L 71/02* (2013.01); *C09D 11/033* (2013.01); *C09D 11/107* (2013.01); *C09D 11/30* (2013.01); *C09D 11/36* (2013.01)

(58) Field of Classification Search
CPC ......... B33Y 10/00; B33Y 70/00; B33Y 30/00; B29C 64/124; C09D 11/107; C09D 11/101; C09D 11/033; C09D 11/36; C09D 11/30; C08L 71/02
USPC ........... 522/96, 90, 1, 6, 189, 184, 71; 520/1
See application file for complete search history.

(56) References Cited

U.S. PATENT DOCUMENTS

| | | | |
|---|---|---|---|
| 6,259,962 B1 | 7/2001 | Gothait | |
| 2005/0053798 A1 | 3/2005 | Maekawa et al. | |
| 2013/0234370 A1* | 9/2013 | Suzuki ................. | C09D 11/101 264/401 |
| 2016/0115297 A1* | 4/2016 | Norikane ............... | B29C 64/129 428/218 |
| 2016/0275818 A1* | 9/2016 | Norikane ................ | C08K 3/34 |
| 2017/0001382 A1 | 1/2017 | Stepper et al. | |
| 2017/0008228 A1* | 1/2017 | Iwata .................... | B29C 64/112 |
| 2017/0252971 A1 | 9/2017 | Umebayashi | |
| 2017/0266336 A1* | 9/2017 | Gande ..................... | A61L 15/20 |
| 2020/0010580 A1* | 1/2020 | Shimada ............... | C08F 290/06 |

FOREIGN PATENT DOCUMENTS

| | | |
|---|---|---|
| AT | 412399 B | 2/2005 |
| CN | 103189187 A | 7/2013 |
| JP | 07196752 * | 8/1995 |

(Continued)

OTHER PUBLICATIONS

Han et al, JP 07196752 Machine Translation, Aug. 1, 1995 (Year: 1995).*
Mori et al, JP 2000-273108 Machine Translation, Oct. 3, 2000 (Year: 2000).*
Iwata et al, WO 2017159871 Machine Translation, Sep. 21, 2017 (Year: 2017).*

(Continued)

*Primary Examiner* — Jessica Whiteley
(74) *Attorney, Agent, or Firm* — Grüneberg and Myers PLLC

(57) ABSTRACT

Provided is an active-energy-ray-curable liquid composition containing a monomer (A) having a hydrogen-bonding capacity and a solvent (B) having a hydrogen-bonding capacity, wherein the active-energy-ray-curable liquid composition satisfies conditions below, <Conditions> a cured product obtained by irradiating the active-energy-ray-curable liquid composition with 500 mJ/cm$^2$ of an active energy ray is a solid having a compressive stress of 2.0 kPa or greater when compressed by 1% at 25 degrees C., and the cured product has a water decaying property.

20 Claims, 1 Drawing Sheet

(56) References Cited

FOREIGN PATENT DOCUMENTS

| | | | | |
|---|---|---|---|---|
| JP | 2000-273108 | | 10/2000 | |
| JP | 2000273108 | * | 10/2000 | |
| JP | 2003-535712 | | 12/2003 | |
| JP | 2005-081563 | | 3/2005 | |
| JP | 2012-111226 | | 6/2012 | |
| JP | 5408207 | | 11/2013 | |
| JP | 2015-183103 | A | 10/2015 | |
| JP | 2015-221566 | A | 12/2015 | |
| WO | WO2015/144761 | | 10/2015 | |
| WO | WO2016/098636 | | 6/2016 | |
| WO | WO2017/029657 | | 2/2017 | |
| WO | WO2017/122211 | | 7/2017 | |
| WO | WO2017/159871 | | 9/2017 | |
| WO | WO-2017159871 | A1 * | 9/2017 | ............. B33Y 70/00 |

OTHER PUBLICATIONS

Communication pursuant to Article 94(3) EPC dated Apr. 17, 2020 in corresponding European Patent Application No. 17 735 647.4, 8 pages.
Japanese Office Action dated Nov. 17, 2020 in Japanese Patent Application No. 2016-241638, 7 pages.
International Search Report dated Aug. 29, 2017 for counterpart International Patent Application No. PCT/JP2017/020866 filed Jun. 5, 2017.
Written Opinion dated Aug. 29, 2017 for counterpart International Patent Application No. PCT/JP2017/020866 filed Jun. 5, 2017.
Japanese Office Action dated Jan. 26, 2021 in Japanese Patent Application No. 2016-117455, 3 pages.
Combined Chinese Office Action and Search Report dated Jan. 26, 2021 in Chinese Patent Application No. 201780036142.5 (with English translation), 34 pages.

* cited by examiner

[Fig. 1]
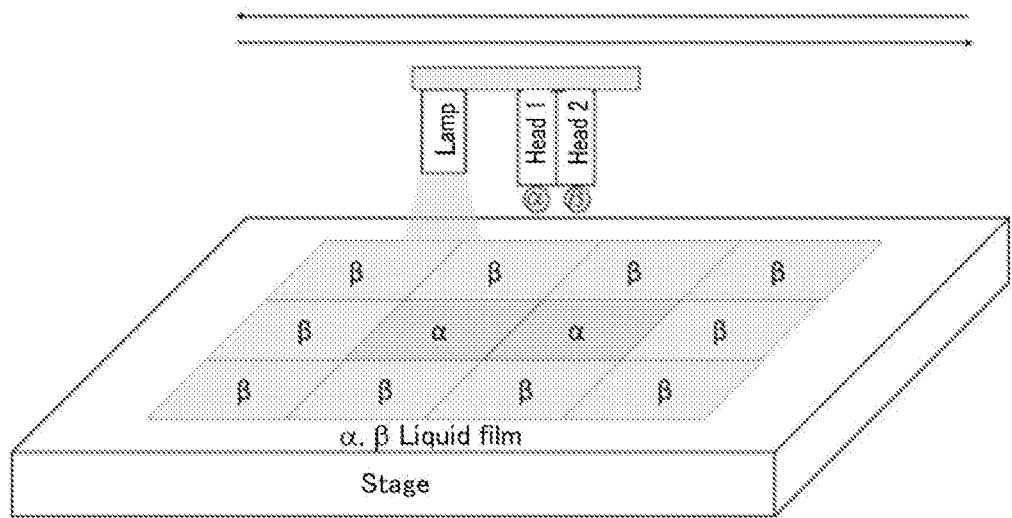
[Fig. 2]
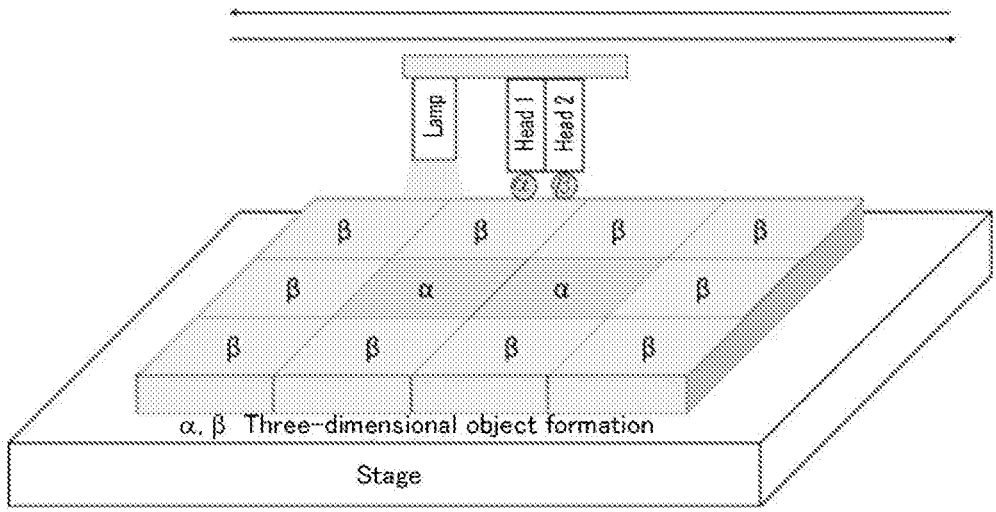

ACTIVE-ENERGY-RAY-CURABLE LIQUID COMPOSITION, THREE-DIMENSIONAL OBJECT FORMING MATERIAL SET, METHOD FOR PRODUCING THREE-DIMENSIONAL OBJECT, AND THREE-DIMENSIONAL OBJECT PRODUCING APPARATUS

TECHNICAL FIELD

The present disclosure relates to an active-energy-ray-curable liquid composition, a three-dimensional object forming material set, a method for producing a three-dimensional object, and a three-dimensional object producing apparatus.

BACKGROUND ART

As the techniques for forming three-dimensional objects, techniques called additive manufacturing (AM) have been known.

These techniques are techniques for forming three-dimensional objects by calculating cross-sectional shapes, which are taken in the layer laminating direction as thin slices, forming layers according to these shapes, and laminating the layers. Furthermore, as the methods for forming three-dimensional objects, for example, fused deposition molding (FDM) methods, inkjetting methods, binder jetting methods, stereo lithography apparatus (SLA) methods, and selective laser sintering (SLS) methods have also been known. Above all, in recent years, there has been known a method of forming an image with a liquid-state photo-curable resin at a necessary portion of an object by a material jetting method, and laminating such images to form a three-dimensional object.

Further, the material jetting method, i.e., a stereo lithography technique by an inkjet method is known to be capable of producing a model part having a shape that is in principle difficult to form (e.g., a shape having an overhang portion). For this technique, a method of supporting the model part by simultaneously forming a support part for supporting the shape is commonly employed. There is proposed a method of forming the support part with the same material as the model part and then removing the support part by a post-process such as cutting and polishing (see, e.g., PTL 1).

Furthermore, the stereo lithography technique by an inkjet method is capable of performing stereo lithography by discharging minute liquid droplets of a plurality of kinds of photo-curable resin compositions having different properties from nozzles respectively. Hence, there is proposed a technique of forming a main body with a photo-curable resin composition that will form a water-insoluble cured product, forming a support part with a photo-curable resin composition that will form a water-soluble cured product, and after forming the shape, dissolving the support part in water to remove the support part (see, e.g., PTL 2).

CITATION LIST

Patent Literature

[PTL 1] Japanese Translation of PCT International Application Publication No. JP-T-2003-535712
[PTL 2] Japanese Unexamined Patent Application Publication No. 2012-111226

SUMMARY OF INVENTION

Technical Problem

The present disclosure has an object to provide an active-energy-ray-curable liquid composition that has a good handling property at normal temperature, has a viscosity that enables the active-energy-ray-curable liquid composition to be discharged by an inkjet method, has a good object forming accuracy and a good shape supporting ability, and can form a shape supporting support part that can be easily removed by water.

Solution to Problem

According to one aspect of the present disclosure, an active-energy-ray-curable liquid composition contains a monomer (A) having a hydrogen-bonding capacity and a solvent (B) having a hydrogen-bonding capacity, and satisfies conditions below.
<Conditions>
A cured product obtained by irradiating the active-energy-ray-curable liquid composition with 500 mJ/cm$^2$ of an active energy ray is a solid having a compressive stress of 2.0 kPa or greater when compressed by 1% at 25 degrees C., and the cured product has a water decaying property.

Advantageous Effects of Invention

The present disclosure can provide an active-energy-ray-curable liquid composition that has a good handling property at normal temperature, has a viscosity that enables the active-energy-ray-curable liquid composition to be discharged by an inkjet method, has a good object forming accuracy and a good shape supporting ability, and can form a shape supporting support part that can be easily removed by water.

BRIEF DESCRIPTION OF DRAWINGS

FIG. 1 is a schematic view illustrating an example of forming a liquid film using a three-dimensional object producing apparatus configured to form a three-dimensional object of the present disclosure.

FIG. 2 is a schematic view illustrating an example of forming a three-dimensional object by laminating the liquid film illustrated in FIG. 1.

DESCRIPTION OF EMBODIMENTS (Active-Energy-Ray-Curable Liquid Composition)
An active-energy-ray-curable liquid composition (hereinafter may also be referred to as "shape supporting liquid") of the present disclosure contains a monomer (A) having a hydrogen-bonding capacity and a solvent (B) having a hydrogen-bonding capacity, satisfies the conditions below, preferably contains a hydrogen-bondable polymer (C) and a polyvalent alcohol (D), and further contains a polymerization initiator and other components as needed.
<Conditions>
A cured product obtained by irradiating the active-energy-ray-curable liquid composition with 500 mJ/cm$^2$ of an active energy ray is a solid having a compressive stress of 2.0 kPa or greater when compressed by 1% at 25 degrees C., and the cured product has a water decaying property.

The active-energy-ray-curable liquid composition of the present disclosure is based on the following finding. According to existing techniques, there is a problem that support parts having a higher solubility are easier to remove but have a poorer supporting ability, and are not able to exert a sufficient shape supporting ability when a shape having a large volume is formed with a large-sized shape forming apparatus.

The active-energy-ray-curable liquid composition of the present disclosure is an active-energy-ray-curable liquid composition that contains a monomer (A) having a hydrogen-bonding capacity and a solvent (B) having a hydrogen-bonding capacity. A cured product of the active-energy-ray curable liquid composition has a water decaying property. The solvent (B) having a hydrogen-bonding capacity is at least one selected from the group consisting of a diol containing 3 or more but 6 or less carbon atoms, a monoalcohol containing 6 or more carbon atoms, a cyclic alcohol containing 6 or more carbon atoms, a polypropylene glycol monoether containing 6 or more carbon atoms, a carboxylic acid compound, an amine compound, an ester compound, a ketone compound, and a urea compound. The active-energy-ray-curable liquid composition preferably contains a hydrogen-bondable polymer (C) and a polyvalent alcohol (D), and further contains a polymerization initiator and other components as needed.

The active-energy-ray-curable liquid composition of the present disclosure preferably has a water decaying property.

The water decaying property means that a cured product is decomposed into minute pieces when immersed in water and becomes unable to maintain the initial shape and properties.

In the present disclosure, normal temperature is, for example, 20 degrees C. or higher but 40 degrees C. or lower.

It is preferable that the active-energy-ray-curable liquid composition of the present disclosure satisfy at least any one of a condition A to a condition C below as the water decaying property.

<Condition A>

When a cured product obtained by irradiating the active-energy-ray-curable liquid composition with 500 mJ/cm$^2$ of an active energy ray and having a depth of 20 mm, a width of 20 mm, and a height of 5 mm is immersed in water (20 mL) and subjected to ultrasonic application at a temperature of either 40 degrees C. or 60 degrees C. for 30 minutes, a residual solid has a volume of 50% by volume or less, and preferably less than 30% by volume.

<Condition B>

When a cured product obtained by irradiating the active-energy-ray-curable liquid composition with 500 mJ/cm$^2$ of an active energy ray and having a depth of 20 mm, a width of 20 mm, and a height of 5 mm is immersed in water (20 mL) and left to stand still at 25 degrees C. for 1 hour, a residual solid has a volume of 90% by volume or less.

<Condition C>

When a cured product obtained by irradiating the active-energy-ray-curable liquid composition with 500 mJ/cm$^2$ of an active energy ray and having a depth of 20 mm, a width of 20 mm, and a height of 5 mm is immersed in water (20 mL) and left to stand still at 25 degrees C. for 1 hour, a residual solid has a size of 1 mm or less in at least one direction or the cured product is completely dissolved.

The cured product having a depth of 20 mm, a width of 20 mm, and a height of 5 mm in the condition A to the condition C can be produced in the manner described below.

The active-energy-ray-curable liquid composition is poured into a silicone rubber mold having a depth of 20 mm, a width of 20 mm, and a height of 5 mm, and irradiated with an ultraviolet ray in an irradiation amount of 500 mJ/cm$^2$ (with an illuminance of 100 mW/cm$^2$, for an irradiation time of 5 seconds) using an ultraviolet irradiator (apparatus name: SUBZERO-LED, available from Integration Technologies, Inc.). In this way, a support part, which is a cured product having a depth of 20 mm, a width of 20 mm, and a height of 5 mm can be obtained.

The volume of the residual solid in the condition B is preferably 90% by volume or less, more preferably 50% by volume or less, and particularly preferably 30% by volume or less. The volume of the residual solid can be measured by the Archimedean method.

It is preferable that the active-energy-ray-curable liquid composition of the present disclosure satisfy the conditions below.

<Conditions>

A cured product obtained by irradiating the active-energy-ray-curable liquid composition with 500 mJ/cm$^2$ of an ultraviolet ray using an ultraviolet irradiator is a solid having a compressive stress of 2.0 kPa or greater when compressed by 1% at 25 degrees C. When the solid (2 g) is immersed in water (20 mL) and left to stand still at 25 degrees C. for 1 hour, a residual solid has a volume of 50% by volume or less. The volume of the residual solid can be measured by the Archimedean method.

When the cured product obtained by irradiating the active-energy-ray-curable liquid composition with 500 mJ/cm$^2$ of an ultraviolet ray using an ultraviolet irradiator satisfies the conditions described above, the function of the cured product as the shape supporting support part can be improved.

It is preferable that the cured product obtained by irradiating the active-energy-ray-curable liquid composition with 500 mJ/cm$^2$ of an ultraviolet ray using an ultraviolet irradiator be a solid having a compressive stress of 0.5 kPa or greater when compressed by 1% at 25 degrees C. When the cured product is a solid having a compressive stress of 0.5 kPa or greater when compressed by 1%, the function of the cured product as the shape supporting support part can be improved.

The compressive stress of the solid when compressed by 1% is also dependent on, for example, the size of the model part, which is the shape supporting target. When the size of the model part is large, it is preferable that the compressive stress of the solid be 2.0 kPa or greater in terms of shape supporting.

The compressive stress by 1% compression can be measured using a universal tester (apparatus name: AG-I, available from Shimadzu Corporation, with a 1 kN load cell and a compression jig for 1 kN).

The ultraviolet irradiator is not particularly limited and may be appropriately selected depending on the intended purpose. For example, the ultraviolet irradiator can be measured using an apparatus named: AG-I (available from Shimadzu Corporation).

When the irradiation amount is 500 mJ/cm$^2$, it is preferable that the illuminance be 100 mW/cm$^2$, and that the irradiation time be 5 seconds.

<Height Change Rate>

A height change rate between before and after a cured product obtained by irradiating the active-energy-ray-curable liquid composition with 500 mJ/cm$^2$ of an active energy ray and having a depth of 20 mm, a width of 20 mm, and a height of 5 mm is left to stand still, i.e., a change rate between a height of the cured product immediately after cured and a height of the cured product after left to stand still at 40 degrees C. for 24 hours is preferably 10% or less. The height change rate is influenced by an object formation time and heat generation during object formation. Therefore, the height change rate is also influenced by the size and the material of the model part, which is the shape supporting target, and the object forming speed. When the object formation time is long and heat generation during object formation is significant, the height change rate is preferably 5% or less and more preferably 1% or less in terms of shape supporting. When the height change rate is 10% or less, the cured product has an excellent shape supporting ability even in a long time of object formation.

<Active Energy Ray>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

Ultraviolet rays are preferable as the active energy ray.

An active energy ray irradiator configured to perform ultraviolet irradiation is not particularly limited and may be appropriately selected depending on the intended purpose. For example, an apparatus named: SUBZERO-LED (available from Integration Technologies, Inc.) can be used.

When the irradiation amount is 500 mJ/cm$^2$, the illuminance is preferably 100 mW/cm$^2$, and the irradiation time is preferably 5 seconds.

<Monomer (A) Having Hydrogen-Bonding Capacity>

The monomer (A) having a hydrogen-bonding capacity is not particularly limited and may be appropriately selected depending on the intended purpose so long as the monomer (A) has a hydrogen-bonding capacity. Examples of the monomer (A) having a hydrogen-bonding capacity include polymerizable monofunctional monomers and polymerizable multifunctional monomers that undergo radical polymerization when irradiated with an active energy ray such as an ultraviolet ray. One of these monofunctional monomers and multifunctional monomers may be used alone or two or more of these monofunctional monomers and multifunctional monomers may be used in combination. Among these monofunctional monomers and multifunctional monomers, monofunctional monomers are preferable in terms of improving a water decaying property.

Examples of the monomer (A) having a hydrogen-bonding capacity include monomers containing an amide group, an amino group, a hydroxyl group, a tetramethylammonium group, a silanol group, an epoxy group, and a sulfo group.

Examples of the polymerization reaction of the monomer (A) having a hydrogen-bonding capacity include radical polymerization, ionic polymerization, coordination polymerization, and ring-opening polymerization. Among these polymerization reactions, radical polymerization is preferable in terms of controllability of the polymerization reaction. Hence, as the monomer (A) having a hydrogen-bonding capacity, ethylenic unsaturated monomers are preferable, and water-soluble monofunctional ethylenic unsaturated monomers and water-soluble multifunctional ethylenic unsaturated monomers are more preferable. Because of a high hydrogen-bonding capacity, water-soluble monofunctional ethylenic unsaturated monomers are particularly preferable.

<<Water-Soluble Monofunctional Ethylenic Unsaturated Monomer Having Hydrogen-Bonding Capacity>>

Examples of the water-soluble monofunctional ethylenic unsaturated monomer having a hydrogen-bonding capacity include monofunctional vinylamide group-containing monomers [e.g., N-vinyl-ε-caprolactam, N-vinylformamide, and N-vinylpyrrolidone]; monofunctional hydroxyl group-containing (meth)acrylates [e.g., hydroxyethyl (meth)acrylate, hydroxypropyl (meth)acrylate, and 4-hydroxybutyl (meth)acrylate]; hydroxyl group-containing (meth)acrylates [e.g., polyethylene glycol mono(meth)acrylate, monoalkoxy (C1 through C4) polyethylene glycol mono(meth)acrylate, polypropylene glycol mono(meth)acrylate, monoalkoxy (C1 through C4) polypropylene glycol mono(meth)acrylate, and mono(meth)acrylates of PEG-PPG block polymers]; (meth)acrylamide derivatives [e.g., (meth)acrylamide, N-methyl (meth)acrylamide, N-ethyl (meth)acrylamide, N-propyl (meth)acrylamide, N-butyl (meth)acrylamide, N,N'-dimethyl (meth)acrylamide, N-hydroxyethyl (meth)acrylamide, N-hydroxypropyl (meth)acrylamide, and N-hydroxybutyl (meth)acrylamide]; and (meth)acryloylmorpholine. One of these water-soluble monofunctional ethylenic unsaturated monomers may be used alone or two or more of these water-soluble monofunctional ethylenic unsaturated monomers may be used in combination. Among these water-soluble monofunctional ethylenic unsaturated monomers, in terms of photoreactivity, (meth)acrylate and (meth)acrylamide derivatives are preferable, and hydroxyethyl acrylate, hydroxypropyl acrylate, 4-hydroxybutyl acrylate, acrylamide, acryloylmorpholine, N-methylacrylamide, N-ethylacrylamide, N-propylacrylamide, N-butylacrylamide, N,N'-dimethylacrylamide, N-hydroxyethyl acrylamide, N-hydroxypropyl acrylamide, N-hydroxybutyl acrylamide, and diethylacrylamide are more preferable. In terms of a low skin irritancy to human bodies, acryloylmorpholine (with a molecular weight of 141.17) and N-hydroxyethyl acrylamide (with a molecular weight of 115.15) are particularly preferable.

<<Water-Soluble Multifunctional Ethylenic Unsaturated Monomer Having Hydrogen-Bonding Capacity>>

Examples of the water-soluble multifunctional ethylenic unsaturated monomer having a hydrogen-bonding capacity include: tripropylene glycol di(meth)acrylate, triethylene glycol di(meth)acrylate, tetraethylene glycol di(meth)acrylate, polypropylene glycol di(meth)acrylate, neopentyl glycol hydroxypivalic acid ester di(meth)acrylate, hydroxypivalic acid neopentyl glycol ester di(meth)acrylate, 1,3-butanediol di(meth)acrylate, 1,4-butanediol di(meth)acrylate, 1,6-hexanediol di(meth)acrylate, 1,9-nonanediol di(meth)acrylate, diethylene glycol di(meth)acrylate, neopentyl glycol di(meth)acrylate, tripropylene glycol di(meth)acrylate, caprolactone-modified hydroxypivalic acid neopentyl glycol ester di(meth)acrylate, propoxylated neopentyl glycol di(meth)acrylate, polyethylene glycol 200 di(meth)acrylate, and polyethylene glycol 400 di(meth)acrylate, which are bifunctional monomers; and triallyl isocyanate and tris(2-hydroxyethyl)isocyanurate tri(meth)acrylate, which are trifunctional or more monomers. One of these water-soluble multifunctional ethylenic unsaturated monomers may be used alone or two or more of these water-soluble multifunctional ethylenic unsaturated monomers may be used in combination.

The molecular weight of the monomer (A) having a hydrogen-bonding capacity is preferably 70 or greater but 2,000 or less and more preferably 100 or greater but 500 or less. When the molecular weight of the monomer (A) is 70 or greater but 2,000 or less, the active-energy-ray-curable liquid composition can be adjusted to the optimum viscosity for an inkjet method.

The content of the monomer (A) having a hydrogen-bonding capacity is preferably from 30% by mass or greater but 60% by mass or less of the total amount of the active-energy-ray-curable liquid composition. When the content of the monomer (A) is 30% by mass or greater but 60% by mass or less, the shape supporting support part can satisfy both of a sufficient compressive stress and a sufficient water decaying property.

<Solvent (B) Having Hydrogen-Bonding Capacity>

The solvent (B) having a hydrogen-bonding capacity has a hydrogen-bonding capacity with respect to the monomer (A) having a hydrogen-bonding capacity. The solvent (B) having a hydrogen-bonding capacity can perform the function as the shape supporting support part by forming a hydrogen bond with the monomer (A) having a hydrogen-bonding capacity.

It is preferable that the solvent (B) having a hydrogen-bonding capacity be a liquid at 25 degrees C.

As the solvent (B) having a hydrogen-bonding capacity, at least one selected from the group consisting of a diol containing 3 or more but 6 or less carbon atoms, a monoalcohol containing 6 or more carbon atoms, a cyclic alcohol containing 6 or more carbon atoms, a polypropylene glycol monoether containing 6 or more carbon atoms, a carboxylic acid compound, an amine compound, an ester compound, a ketone compound, and a urea compound is preferable, and a diol containing 3 or more but 6 or less carbon atoms and a monoalcohol containing 6 or more carbon atoms are more preferable.

<<Diol Containing 3 or More but 6 or Less Carbon Atoms>>

The diol containing 3 or more but 6 or less carbon atoms is preferably a material that does not have reactivity with a water-soluble acrylic monomer, does not inhibit a radical polymerization reaction during curing, has fluidity at normal temperature, and has water solubility.

As the diol containing 3 or more but 6 or less carbon atoms, both of a monofunctional diol and a multifunctional diol can be used.

The diol containing 3 or more but 6 or less carbon atoms is not particularly limited, may be appropriately selected depending on the intended purpose, but is preferably an alcohol having a SP value of 22 $MPa^{1/2}$ or less.

Examples of the diol containing 3 or more but 6 or less carbon atoms include propanediol, butanediol, pentanediol, and hexanediol. One of these diols may be used alone or two or more of these diols may be used in combination. Among these diols, 1,3-propanediol, 1,4-butanediol, 1,5-pentanediol, and 1,6-hexanediol are preferable. The number of carbon atoms is 3 or more but 6 or less, and preferably 3 or more but 5 or less. When the number of carbon atoms is 3 or more, the compressive stress by 1% compression can be improved. When the number of carbon atoms is 6 or less, the viscosity of the active-energy-ray-curable liquid composition can be suppressed.

The carbon chain of the diol containing 3 or more but 6 or less carbon atoms may be straight-chained or branched.

The content of the diol containing 3 or more but 6 or less carbon atoms is preferably 10% by mass or greater but 50% by mass or less of the total amount of the active-energy-ray-curable liquid composition. When the content of the diol containing 3 or more but 6 or less carbon atoms is 10% by mass or greater but 50% by mass or less, the shape supporting support part can satisfy both of a sufficient compressive stress and a sufficient water decaying property.

<Ratio by Mass (Monomer (A) Having Hydrogen-Bonding Capacity/Diol Containing 3 or More but 6 or Less Carbon Atoms)>

A ratio by mass (monomer (A) having a hydrogen-bonding capacity/diol containing 3 or more but 6 or less carbon atoms) of the content (% by mass) of the monomer (A) having a hydrogen-bonding capacity to the content (% by mass) of the diol containing 3 or more but 6 or less carbon atoms is preferably 0.3 or greater but 2.5 or less and more preferably 0.5 or greater but 2.5 or less. When the ratio by mass (monomer (A) having a hydrogen-bonding capacity/diol containing 3 or more but 6 or less carbon atoms) is 0.3 or greater but 2.5 or less, the compressive stress by 1% compression can be improved.

<<Monoalcohol Containing 6 or More Carbon Atoms>>

The monoalcohol containing 6 or more carbon atoms is preferably free of a cyclic structure in terms of the hydrogen-containing capacity, and is more preferably a straight-chained monoalcohol containing 6 or more carbon atoms. The upper limit of the number of carbon atoms is not particularly limited, may be appropriately selected in terms of the water decaying property, but is preferably 20 or less and more preferably 12 or less.

It is preferable that the monoalcohol containing 6 or more carbon atoms not have reactivity with a water-soluble acrylic monomer, not inhibit a radical polymerization reaction during photo-curing, and have fluidity at normal temperature.

The monoalcohol containing 6 or more carbon atoms is not particularly limited and may be appropriately selected depending on the intended purpose. Examples of the monoalcohol containing 6 or more carbon atoms include higher alcohols (e.g., 1-hexanol, 1-decanol, and 1-dodecanol), cyclohexanol (with a SP value of 22.4 $MPa^{1/2}$) and cyclopentanol, which are cyclic alcohols, and alkylene oxides of monoalcohols containing an oxypropylene group or an oxyethylene group. One of these monoalcohols containing 6 or more carbon atoms may be used alone or two or more of these monoalcohols containing 6 or more carbon atoms may be used in combination.

It is preferable that the monoalcohol containing 6 or more carbon atoms include a monoalcohol containing 6 or more carbon atoms and having a solubility parameter (hereinafter may also be referred to as "SP value") of 22 $MPa^{1/2}$ or less.

The monoalcohol containing 6 or more carbon atoms and having a SP value of 22 $MPa^{1/2}$ or less is not particularly limited and may be appropriately selected depending on the intended purpose. Examples of the monoalcohol containing 6 or more carbon atoms and having a SP value of 22 $MPa^{1/2}$ or less include higher alcohols.

Examples of the higher alcohols include 1-hexanol (with a SP value of 21.0 $MPa^{1/2}$), 1-decanol containing 10 or more carbon atoms (with a SP value of 19.7 $MPa^{1/2}$), and 1-dodecanol (with a SP value of 18.9 $MPa^{1/2}$). One of these higher alcohols may be used alone or two or more of these higher alcohols may be used in combination. Among these higher alcohols, 1-decanol (with a SP value of 19.7 $MPa^{1/2}$) and 1-dodecanol (with a SP value of 18.9 $MPa^{1/2}$) are preferable.

The monoalcohol containing 6 or more carbon atoms is hydrophobic, contains many carbon atoms, and can make a cured product, which is formed by alkyl chains being aligned or entangled, hard.

The content of the monoalcohol containing 6 or more carbon atoms is preferably 20% by mass or greater buy 70% by mass or less of the total amount of the support part for three-dimensional object formation. When the content of the monoalcohol containing 6 or more carbon atoms is 20% by mass or greater but 70% by mass or less, the shape supporting support part can satisfy both of a sufficient compressive stress and a sufficient water decaying property.

<<Cyclic Alcohol Containing 6 or More Carbon Atoms>>

Examples of the cyclic alcohol include cyclohexanol (with a SP value of 22.4 $MPa^{1/2}$).

The content of the cyclic alcohol containing 6 or more carbon atoms is preferably 20% by mass or greater but 70% by mass or less of the total amount of the active-energy-ray-curable liquid composition. When the content of the cyclic alcohol containing 6 or more carbon atoms is 20% by mass or greater but 70% by mass or less, the shape supporting support part can satisfy both of a sufficient compressive stress and a sufficient water decaying property.

<Ratio by Mass (Monomer (A) Having Hydrogen-Bonding Capacity/Cyclic Alcohol Containing 6 or More Carbon Atoms)>

A ratio by mass (monomer (A) having a hydrogen-bonding capacity/cyclic alcohol containing 6 or more carbon atoms) of the content (% by mass) of the monomer (A) having a hydrogen-bonding capacity to the content (% by mass) of the cyclic alcohol containing 6 or more carbon atoms is preferably 0.20 or greater but 2.5 or less and more preferably 0.3 or greater but 1.5 or less. When the ratio by mass (monomer (A) having a hydrogen-bonding capacity/cyclic alcohol containing 6 or more carbon atoms) is 0.20 or greater but 2.5 or less, the cured product to be obtained can have an improved compressive stress when compressed by 1% at 25 degrees C.

<<Polypropylene Glycol Monoether Containing 6 or More Carbon Atoms>>

The polypropylene glycol monoether containing 6 or more carbon atoms is not particularly limited and may be appropriately selected depending on the intended purpose. Examples of the polypropylene glycol monoether containing 6 or more carbon atoms include tripropylene glycol monomethyl ether (with a SP value of 21.3 $MPa^{1/2}$) and tripropylene glycol monoethyl ether.

The content of the polypropylene glycol monoether containing 6 or more carbon atoms is preferably 20% by mass or greater but 70% by mass or less of the total amount of the active-energy-ray-curable liquid composition. When the content of the polypropylene glycol monoether containing 6 or more carbon atoms is 20% by mass or greater but 70% by mass or less, the shape supporting support part can satisfy both of a sufficient compressive stress and a sufficient water decaying property.

<Ratio by Mass (Monomer (A) Having Hydrogen-Bonding Capacity/Polypropylene Glycol Monoether Containing 6 or More Carbon Atoms)>

A ratio by mass (monomer (A) having a hydrogen-bonding capacity/polypropylene glycol monoether containing 6 or more carbon atoms) of the content (% by mass) of the monomer (A) having a hydrogen-bonding capacity to the content (% by mass) of the polypropylene glycol monoether containing 6 or more carbon atoms is preferably 0.20 or greater but 2.5 or less and more preferably 0.3 or greater but 1.5 or less. When the ratio by mass (monomer (A) having a hydrogen-bonding capacity/polypropylene glycol monoether containing 6 or more carbon atoms) is 0.20 or greater, the cured product to be obtained can have an improved water solubility. When the ratio by mass (monomer (A) having a hydrogen-bonding capacity/polypropylene glycol monoether containing 6 or more carbon atoms) is 0.20 or greater but 2.5 or less, the cured product to be obtained can have an improved compressive stress when compressed by 1% at 25 degrees C.

<<Carboxylic Acid Compound>>

Examples of the carboxylic acid compound include: straight-chained fatty acids such as formic acid, acetic acid, propionic acid, butanoic acid, pentanoic acid, and hexylic acid; various branched aliphatic carboxylic acids such as isobutyric acid, t-butyric acid, isopentyl acid, isooctyl acid, and 2-ethylhexyl acid; aromatic carboxylic acids such as benzoic acid and benzenesulfonic acid; hydroxycarboxylic acids such as glycolic acid and lactic acid. One of these carboxylic acid compounds may be used alone or two or more of these carboxylic acid compounds may be used in combination. Among these carboxylic acid compounds, in terms of water solubility, acetic acid, propionic acid, butanoic acid, and lactic acid are preferable and butanoic acid and lactic acid are more preferable.

<<Amine Compound>>

Examples of the amine compound include: primary through tertiary amines such as monoalkylamine, dialkylamine, and trialkylamine; divalent amines such as ethylenediamine; trivalent amines such as triethylenediamine; and aliphatic amines such as pyridine and aniline One of these amine compounds may be used alone or two or more of these amine compounds may be used in combination. Among these amine compounds, in terms of cross-linking strength by hydrogen bonding and water solubility, divalent or trivalent primary amines are preferable and ethylenediamine is more preferable.

<<Ester Compound>>

Examples of the ester compound include: monofunctional esters such as ethyl acetate, butyl acetate, and ethyl propionate; multifunctional aliphatic esters such as dimethyl succinate and dimethyl adipate; and multifunctional aromatic esters such as dimethyl terephthalate. One of these ester compounds may be used alone or two or more of these ester compounds may be used in combination. Among these ester compounds, in terms of water solubility and evaporation, odors, and safety during object formation, dimethyl adipate is preferable.

<<Ketone Compound>>

Examples of the ketone compound include: monofunctional ketones such as acetone and methyl ethyl ketone; and multifunctional ketones such as acetylacetone and 2,4,6-heptatrione. One of these ketone compounds may be used alone or two or more of these ketone compounds may be used in combination. Among these ketone compounds, in terms of volatility and water solubility, acetylacetone is preferable.

The content of the solvent (B) having a hydrogen-bonding capacity is preferably 10% by mass or greater but 50% by mass or less of the total amount of the active-energy-ray-curable liquid composition. When the content of the solvent (B) having a hydrogen-bonding capacity is 10% by mass or greater but 50% by mass or less, the shape supporting support part can satisfy both of a sufficient compressive stress and a sufficient water decaying property.

<Ratio by Mass (A/B)>

A ratio by mass (A/B) of the content (% by mass) of the component (A) to the content (% by mass) of the component (B) is preferably 0.20 or greater but 2.5 or less, more preferably 0.3 or greater but 2.5 or less, and particularly preferably 0.5 or greater but 2.5 or less. When the ratio by mass (A/B) is 0.20 or greater but 2.5 or less, the compressive stress by 1% compression can be improved.

<Hydrogen-Bondable Polymer (C)>

The hydrogen-bondable polymer (C) is preferably a material that does not have reactivity with a water-soluble acrylic monomer, does not inhibit radical polymerization reaction during photo-curing, has fluidity at normal temperature, and has water solubility.

The hydrogen-bondable polymer (C) is not particularly limited and may be appropriately selected depending on the intended purpose. Examples of the hydrogen-bondable polymer (C) include active hydrogen compounds.

The active hydrogen compound is not particularly limited and may be appropriately selected depending on the intended purpose. For example, both of monofunctional compounds and multifunctional compounds such as alcohols, ethers, amides, and esters may be used.

Examples of the active hydrogen compound include alkylene oxide adducts, monovalent or greater but tetravalent or less alcohols, and amine compounds. Among these active hydrogen compounds, alkylene oxide adducts and monovalent or greater but divalent or less alcohols are preferable.

Examples of the alkylene oxide adducts include polypropylene glycol, polyethylene glycol, and polypropylene glycol monobutyl ether.

The number average molecular weight of the hydrogen-bondable polymer (C) is preferably 400 or greater, more preferably 400 or greater but 5,000 or less, and particularly preferably 400 or greater but 2,000 or less in terms of enabling the cured product of the support material to satisfy both of the height change rate and water solubility. The number average molecular weight can be measured by gel permeation chromatography (GPC).

The content of the hydrogen-bondable polymer (C) is preferably 10% by mass or greater but 50% by mass or less and more preferably 25% by mass or greater but 50% by mass or less of the total amount of the active-energy-ray-curable liquid composition in terms of water solubility.

<Polyvalent Alcohol (D) Having SP Value of 30 $MPa^{1/2}$ or Greater>

The polyvalent alcohol (D) having a SP value of 30 $MPa^{1/2}$ or greater can improve hydrophilicity of the support part to be formed, and can improve removability of the support part.

The polyvalent alcohol (D) having a SP value of 30 $MPa^{1/2}$ or greater is not particularly limited and may be appropriately selected depending on the intended purpose. Examples of the polyvalent alcohol (D) having a SP value of 30 $MPa^{1/2}$ or greater include glycerin (with a SP value of 34.2 $MPa^{1/2}$) and 1,3-propanediol (with a SP value of 31.7 $MPa^{1/2}$). One of these polyvalent alcohols may be used alone or two or more of these polyvalent alcohols may be used in combination. Among these polyvalent alcohols, glycerin is preferable in terms of a water decaying property.

The content of the polyvalent alcohol (D) having a SP value of 30 $MPa^{1/2}$ or greater is preferably 1% by mass or greater but 30% by mass or less of the total amount of the active-energy-ray-curable liquid composition. When the content of the polyvalent alcohol (D) having a SP value of 30 $MPa^{1/2}$ or greater is 1% by mass or greater but 30% by mass or less, the shape supporting support part can satisfy both of a sufficient compressive stress and a sufficient water decaying property.

<Polymerization Initiator>

As the polymerization initiator, an arbitrary substance that produces radicals upon irradiation of light (particularly, ultraviolet rays having a wavelength of from 220 nm through 400 nm) may be used.

Examples of the polymerization initiator include acetophenone, 2,2-diethoxyacetophenone, p-dimethylaminoacetophenone, benzophenone, 2-chlorobenzophenone, p,p'-dicyclobenzophenone, p,p-bisdiethylaminobenzophenone, Michler's ketone, benzyl, benzoin, benzoin methyl ether, benzoin ethyl ether, benzoin isopropyl ether, benzoin-n-propyl ether, benzoin isobutyl ether, benzoin-n-butyl ether, benzylmethyl ketal, thioxanthone, 2-chlorothioxanthone, 2-hydroxy-2-methyl-1-phenyl-1-one, 1-(4-isopropylphenyl)-2-hydroxy-2-methylpropan-1-one, methylbenzoyl formate, 1-hydroxycyclohexylphenyl ketone, azobis isobutyronitrile, benzoyl peroxide, and ditert-butyl peroxide. One of these polymerization initiators may be used alone or two or more of these polymerization initiators may be used in combination. It is preferable to select a polymerization initiator that matches the ultraviolet wavelength of the ultraviolet irradiator.

The content of the polymerization initiator is preferably 0.5% by mass or greater but 10% by mass or less of the total amount of the active-energy-ray-curable liquid composition.

The surface tension of the active-energy-ray-curable liquid composition is not particularly limited, may be appropriately selected depending on the intended purpose, and is preferably 20 mN/m or greater but 45 mN/m or less and more preferably 25 mN/m or greater but 34 mN/m or less. When the surface tension of the active-energy-ray-curable liquid composition is 20 mN/m or greater, it is possible to prevent discharging instability (e.g., bending of the discharging direction and no discharging) during object formation. When the surface tension of the active-energy-ray-curable liquid composition is 45 mN/m or less, it is possible to fill, for example, discharging nozzles for object formation with the liquid easily.

The surface tension of the active-energy-ray-curable liquid composition can be measured with, for example, a surface tensiometer (automatic contact angle meter DM-701, available from Kyowa Interface Science Co., Ltd.).

—Viscosity—

The viscosity of the active-energy-ray-curable liquid composition is preferably 100 mPa·s or less at 25 degrees C., more preferably 3 mPa·s or greater but 20 mPa·s or less at 25 degrees C., and particularly preferably 6 mPa·s or greater but 12 mPa·s or less.

When the viscosity of the active-energy-ray-curable liquid composition is 100 mPa·s or less, discharging stability can be improved.

The viscosity of the active-energy-ray-curable liquid composition can be measured with, for example a rotational viscometer (VISCOMATE VM-150III, available from Toki Sangyo Co., Ltd.) at 25 degrees C.

—Viscosity Change Rate—

It is preferable that a viscosity change rate of the active-energy-ray-curable liquid composition between before and after the active-energy-ray-curable liquid composition is left to stand at 50 degrees C. for 2 weeks be ±20% or less and more preferably ±10% or less.

When the viscosity change rate of the active-energy-ray-curable liquid composition is ±20% or less, storage stability is adequate and discharging stability is good.

When the viscosity change rate of the active-energy-ray-curable liquid composition between before and after the active-energy-ray-curable liquid composition is left to stand at 50 degrees C. for 2 weeks can be measured in the manner described below.

The active-energy-ray-curable liquid composition, which is poured in a widemouthed bottle (50 mL) formed of polypropylene, is left to stand in a thermostat bath of 50 degrees C. for 2 weeks, taken out from the thermostat bath, and left to stand until the active-energy-ray-curable liquid composition becomes room temperature (25 degrees C.). Then, the viscosity of the active-energy-ray-curable liquid composition is measured. The viscosity change rate can be measured according to a formula below where viscosity before storage is the viscosity of the active-energy-ray-curable liquid composition before put in the thermostat bath and viscosity after storage is the viscosity of the active-energy-ray-curable liquid composition after taken out from the thermostat bath. The viscosity before storage and the viscosity after storage can be measured with, for example, an R-type viscometer (available from Toki Sangyo Co., Ltd.) at 25 degrees C.

Viscosity change rate (%)=[(viscosity after storage)−(viscosity before storage)]/(viscosity before storage)×100

<Other Components>

The other components are not particularly limited and may be appropriately selected depending on the intended purpose. Examples of the other components include a solvent, a polymerization inhibitor, a mineral dispersible in the active-energy-ray-curable liquid composition, a polymerizable monomer different from the component (A), a thermal polymerization initiator, a colorant, an antioxidant, a chain-transfer agent, an age resistor, a cross-linking promoter, an ultraviolet absorber, a plasticizer, an antiseptic, and a dispersant.

—Solvent—

Examples of the solvent include alcohols, ether compounds, triol, triethylene glycol, and polypropylene glycol. One of these solvents may be used alone or two or more of these solvents may be used in combination.

The SP value of the solvent is preferably 18 MPa$^{1/2}$ or greater and more preferably 23 MPa$^{1/2}$ or greater in terms of a water decaying property.

The content of the solvent is preferably 50% by mass or less and more preferably 30% by mass or less of the total amount of the active-energy-ray-curable liquid composition.

—Polymerization Inhibitor—

Examples of the polymerization inhibitor include phenol compounds [e.g., hydroquinone, hydroquinone monomethyl ether, 2,6-di-t-butyl-p-cresol, 2,2-methylene-bis-(4-methyl-6-t-butylphenol), and 1,1,3-tris-(2-methyl-4-hydroxy-5-t-butylphenyl)butane], sulfur compounds [e.g., di-laurylthio dipropionate], phosphorus compounds [e.g., triphenyl phosphite], and amine compounds [e.g., phenothiazine]. One of these polymerization inhibitors may be used alone or two or more of these polymerization inhibitors may be used in combination.

The content of the polymerization inhibitor is typically preferably 30% by mass or less and preferably 20% by mass or less of the total amount of the active-energy-ray-curable liquid composition in terms of compressive stress.

—Mineral Dispersible in Active-Energy-Ray-Curable Liquid Composition—

The mineral dispersible in the active-energy-ray-curable liquid composition is not particularly limited and may be appropriately selected depending on the intended purpose.

Examples of the mineral dispersible in the active-energy-ray-curable liquid composition include a layered clay mineral.

Examples of the layered clay mineral include: smectites such as montmorillonite, beidellite, hectorite, saponite, nontronite, and stevensite; vermiculite; bentonite; and layered sodium silicates such as kanemite, kenyaite, and macanite. One of these layered clay minerals may be used alone or two or more of these layered clay minerals may be used in combination.

The layered clay mineral may be a naturally occurring layered clay mineral or may be a layered clay mineral produced by a chemical synthesis method.

The surface of the layered clay mineral may be treated with an organic substance.

When a layered inorganic substance such as the layered clay mineral is treated with an organic cationic compound, an interlayer cation of the layered inorganic substance may be ion-exchanged with a cationic group such as a quaternary salt.

Examples of the cation of the layered clay mineral include metal cations such as a sodium ion and a calcium ion.

The layered clay mineral treated with an organic cationic compound is more easily swellable by and more easily dispersible in the polymer and the polymerizable monomer mentioned above.

Examples of the layered clay mineral treated with an organic cationic compound include LUCENTITE SERIES (available from Co-op Chemical Co., Ltd.). Examples of the LUCENTITE SERIES (available from Co-op Chemical Co., Ltd.) include LUCENTITE SPN, LUCENTITE SAN, LUCENTITE SEN, and LUCENTITE STN. One of these layered clay minerals treated with an organic cationic compound may be used alone or two or more of these layered clay minerals treated with an organic cationic compound may be used in combination.

—Polymerizable Monomer—

The polymerizable monomer is not particularly limited and may be appropriately selected depending on the intended purpose. Examples of the polymerizable monomer include (meth)acrylate.

Examples of the (meth)acrylate include 2-ethylhexyl (meth)acrylate (EHA), isobornyl (meth)acrylate, 3-methoxybutyl (meth)acrylate, lauryl (meth)acrylate, 2-phenoxyethyl (meth)acrylate, isodecyl (meth)acrylate, isooctyl (meth)acrylate, tridecyl (meth)acrylate, caprolactone (meth)acrylate, and ethoxylated nonylphenol (meth)acrylate. One of these (meth)acrylates may be used alone or two or more of these (meth)acrylates may be used in combination.

—Thermal Polymerization Initiator—

The thermal polymerization initiator is not particularly limited and may be appropriately selected depending on the intended purpose. Examples of the thermal polymerization initiator include an azo-based initiator, a peroxide initiator, a persulfate initiator, and a redox (oxido-reduction) initiator. Note, however, that a photopolymerization initiator is more preferable than the thermal polymerization initiator in terms of storage stability.

Examples of the azo-based initiator include: VA-044, VA-46B, V-50, VA-057, VA-061, VA-067, VA-086, 2,2'-azobis(4-methoxy-2,4-dimethyl valeronitrile) (VAZO 33), 2,2'-azobis(2-amidinopropane) dihydrochloride (VAZO 50), 2,2'-azobis(2,4-dimethyl valeronitrile) (VAZO 52), 2,2'-azobis(isobutyronitrile) (VAZO64), 2,2'-azobis-2-methyl butyronitrile (VAZO 67), and 1,1-azobis(1-cyclohexanecarbonitrile) (VAZO 88) (all available from Du Pont Chemical Kabushiki Kaisha); and 2,2'-azobis(2-cyclopropyl propionitrile) and 2,2'-azobis(methyl isobutyrate) (V-601) (available from Wako Pure Chemical Industries, Ltd.).

Examples of the peroxide initiator include: benzoyl peroxide, acetyl peroxide, lauroyl peroxide, decanoyl peroxide, dicetyl peroxydicarbonate, and di(4-t-butyl cyclohexyl)peroxydicarbonate (PERKADOX 16S) (available from Akzo Nobel N.V.); di(2-ethyl hexyl)peroxydicarbonate and t-butyl peroxypivalate (LUPERSOL 11) (available from Elf Atochem, Inc.); t-butyl peroxy-2-ethyl hexanoate (TRIGONOX 21-C50) (available from Akzo Nobel N.V.); and dicumyl peroxide.

Examples of the persulfate initiator include potassium persulfate, sodium persulfate, and ammonium persulfate.

Examples of the redox (oxido-reduction) initiator include a combination of the persulfate initiator with a reducing agent such as sodium hydrogen methasulfite and sodium hydrogen sulfite, a system based on the organic peroxide and a tertiary amine (e.g., a system based on benzoyl peroxide and dimethyl aniline), and a system based on an organic hydroperoxide and a transition metal (e.g., a system based on cumene hydroperoxide and cobalt naphthenate).

—Colorant—

Examples of the colorant include a pigment and a dye.

Examples of the pigment include an organic pigment and an inorganic pigment.

Examples of the organic pigment include an azo-pigment, a polycyclic pigment, an azine pigment, a daylight fluorescent pigment, a nitroso pigment, a nitro pigment, and a natural pigment.

Examples of the inorganic pigment include metal oxides (e.g., iron oxide, chromium oxide, and titanium oxide), and carbon black.

—Antioxidant—

Examples of the antioxidant include a phenol compound [e.g., monocyclic phenol (e.g., 2,6-di-t-butyl-p-cresol), bisphenol [e.g., 2,2'-methylenebis(4-methyl-6-t-butyl phenol)], and polycyclic phenol [e.g., 1,3,5-trimethyl-2,4,6-tris(3,5-di-t-butyl-4-hydroxybenzyl)benzene]], a sulfur compound (e.g., dilauryl 3,3'-thiodipropionate), a phosphorus compound (e.g., triphenyl phosphite), and an amine compound (e.g., octylated diphenylamine).

—Chain-Transfer Agent—

Examples of the chain-transfer agent include: a hydrocarbon [e.g., a compound containing 6 or more but 24 or less carbon atoms, such as an aromatic hydrocarbon (e.g., toluene and xylene) and an unsaturated aliphatic hydrocarbon (e.g., 1-butene and 1-nonene)]; a halogenated hydrocarbon (e.g., a compound containing 1 or more but 24 or less carbon atoms, such as dichloromethane and carbon tetrachloride); an alcohol (e.g., a compound containing 1 or more but 24 or less carbon atoms, such as methanol and 1-butanol); a thiol (e.g., a compound containing 1 or more but 24 or less carbon atoms, such as ethyl thiol and 1-octyl thiol); a ketone (e.g., a compound containing 3 or more but 24 or less carbon atoms, such as acetone and methyl ethyl ketone); an aldehyde (e.g., a compound containing 2 or more but 18 or less carbon atoms, such as 2-methyl-2-propyl aldehyde and 1-pentyl aldehyde); a phenol (e.g., a compound containing 6 or more but 36 or less carbon atoms, such as phenol, m-cresol, p-cresol, and o-cresol); a quinone (e.g., a compound containing 6 or more but 24 or less carbon atoms, such as hydroquinone); an amine (e.g., a compound containing 3 or more but 24 or less carbon atoms, such as diethyl methylamine and diphenylamine); and a disulfide (e.g., a compound containing 2 or more but 24 or less carbon atoms, such as diethyl sulfide and di-1-octyl disulfide).

<Supporting Power of Cured Product of Active-Energy-Ray-Curable Liquid Composition>

The supporting power of the cured product of the active-energy-ray-curable liquid composition of the present disclosure (hereinafter, the cured product may also be referred to as "support part") is the capacity of the support part to support the model part, and can be expressed by the compressive stress by 1% compression.

As the supporting power of the support part, the compressive stress by 1% compression at 25 degrees C. is preferably 0.5 kPa or greater and more preferably 2.0 kPa or greater in terms of the accuracy with which an object is formed, and solubility of the support part.

The supporting power of the support part can be adjusted to the range described above based on selection of the kinds and contents of the components (A) and (B) constituting the support part. The compressive stress by 1% compression can be measured with a universal tester (available from Shimadzu Corporation, AG-I).

It is considered that hydrogen bonding of the component (B) with the polymer obtained from polymerization of the component (A) ensures the support part of the present disclosure a high supporting power.

<Removability of Support Part>

As described above, the supporting power of the support part of the present disclosure is based on hydrogen bonding. When the support part is immersed in water, the supporting power of the support part is weakened, and the support part decays and can be removed. When the molecular weight of the component (B) is low, the support part diffuses quickly and can be removed in a short time.

—Solvent Liquid—

The solvent liquid may be, for example, a solvent liquid having a hydrogen-bonding capacity.

Examples of the solvent liquid include water, butanol and hexanol, which are alcohols, hexylamine and pentylamine, which are amines, and benzene and toluene, which are aromatic compounds. One of these solvent liquids may be used alone or two or more of these solvent liquids may be used in combination. Among these solvent liquids, water and alcohols are preferable in terms of safety.

An additive may be added to the solvent liquid.

Examples of the additive include a surfactant. With adjustment of the kind and amount of the surfactant, the solvent liquid can have an improved affinity with straight-chain alkyl chains.

The temperature of the solvent liquid is preferably 40 degrees C. or higher in terms of softening the support part to make the support part more easily permeable by the solvent liquid, but may be a temperature lower than 40 degrees C. in terms of preventing warpage of the three-dimensional object.

(Three-Dimensional Object Forming Material Set)

A three-dimensional object forming material set of the present disclosure includes the active-energy-ray-curable liquid composition of the present disclosure and an active-energy-ray-curable liquid composition that does not have a water decaying property, and further includes other materials as needed.

As the active-energy-ray-curable liquid composition, the same as the active-energy-ray-curable liquid composition of the present disclosure can be used.

The active-energy-ray-curable liquid composition that does not have a water decaying property is not particularly limited and may be appropriately selected depending on the intended purpose. Examples of the active-energy-ray-curable liquid composition that does not have a water decaying property include a model material.

(Method for Producing Three-Dimensional Object and Three-Dimensional Object Producing Apparatus)

A method for producing a three-dimensional object of the present disclosure produces a three-dimensional object with the active-energy-ray-curable liquid composition of the present disclosure, and further includes other steps as needed.

The method for producing a three-dimensional object of the present disclosure repeats a liquid film forming step of forming a liquid film with the model material and the active-energy-ray-curable liquid composition (shape supporting liquid, support material) of the present disclosure and a curing step of curing the liquid film to form a model part, which is a cured product of the model material, and a support part, which is a cured product of the active-energy-ray-curable liquid composition (shape supporting liquid, support material), and then removes the support part by water or water vapor, and further includes other steps as needed.

It is preferable to remove the support part by water or water vapor.

A three-dimensional object producing apparatus of the present disclosure includes a container storing the active-energy-ray-curable liquid composition, a liquid film forming unit configured to form a liquid film with the active-energy-ray-curable liquid composition, and a curing unit configured to cure the liquid film, and further includes other units as needed.

The method for producing a three-dimensional object can be favorably performed by the three-dimensional object producing apparatus.

<Liquid Film Forming Step and Liquid Film Forming Unit>

The liquid film forming step is a step of forming a liquid film while controlling a position to be coated with the active-energy-ray-curable liquid composition of the present disclosure and an amount of the active-energy-ray-curable liquid composition of the present disclosure to be coated.

The liquid film forming unit is a unit configured to form a liquid film while controlling a position to be coated with the active-energy-ray-curable liquid composition of the present disclosure and an amount of the active-energy-ray-curable liquid composition of the present disclosure to be coated.

The liquid film forming step can be favorably performed by the liquid film forming unit.

As the active-energy-ray-curable liquid composition, the same as the active-energy-ray-curable liquid composition of the present disclosure can be used.

It is preferable to perform the liquid film forming step by any one of an inkjet method and a dispenser method.

<Curing Step and Curing Unit>

The curing step is a step of curing the liquid film.

The curing unit is a unit configured to cure the liquid film.

The curing step can be favorably performed by the curing unit.

Examples of the curing unit include an ultraviolet irradiator.

—Ultraviolet Irradiator—

Examples of the ultraviolet (UV) irradiator include a high-pressure mercury lamp, an ultrahigh-pressure mercury lamp, and metal halide.

Although the high-pressure mercury lamp is a point light, a deep UV type combined with an optical system to be improved in light use efficiency can emit light of a short wavelength range.

The metal halide is effective for a colored material because the metal halide covers a wide wavelength range. As the metal halide, a halide of a metal such as Pb, Sn, and Fe is used and may be selected depending on the absorption spectrum of the polymerization initiator. The lamp to be used for curing is not particularly limited and may be appropriately selected depending on the intended purpose. For example, a commercially available lamp such as an H lamp, a D lamp, or a V lamp available from Fusion Systems Japan Co., Ltd. can be used.

It is preferable that the three-dimensional object producing apparatus be heaterless and capable of forming an object at normal temperature.

A specific embodiment for forming a three-dimensional object with the active-energy-ray-curable liquid composition of the present disclosure will be described below.

First, surface data or solid data of a three-dimensional shape designed by three-dimensional CAD or surface data or solid data of a three-dimensional shape captured by a three-dimensional scanner or digitizer is converted to a STL format and input to a laminated object manufacturing apparatus.

Next, based on the input data, directional placement of the three-dimensional object to be formed during object formation is determined. The directional placement during object formation is not particularly limited, but directional placement in which the three-dimensional object to be formed is shortest in the Z direction (height direction) is typically selected.

After the directional placement during object formation is determined, the projected areas of the three-dimensional shape on the X-Y plane, the X-Z plane, and the Y-Z plane are calculated. The obtained block shape is sliced at one-layer-thickness intervals in the Z-direction. The thickness of one layer is dependent on the material used, but typically about 20 micrometers or greater but about 60 micrometers or less. When there is one object to be formed, this block shape is placed at the center of a Z stage (i.e., a table on which the object is placed and that is brought down by a distance corresponding to one layer each time one layer is formed). When a plurality of objects are formed simultaneously, the block shapes are placed on the Z stage. Here, it is also possible to stack up the block shapes. Based on designation of the material to be used, it is possible to automate block shaping, generation of slice data (contour data), and placement on the Z stage.

Next, the object forming step is performed. Different head 1 and head 2 (FIG. 1) are bidirectionally moved to discharge a model material precursor liquid α and the active-energy-ray-curable liquid composition β, to form dots. By further forming continuous dots, it is possible to form a liquid film at a desired position. The liquid film is irradiated with an ultraviolet (UV) ray to be cured. In this way, a model material film and a support material film can be formed at desired positions.

After one layer of a model material film and a support material film is formed, the stage (FIG. 1) is brought down by a distance corresponding to one layer. Again, continuous dots are formed on the model material film and the support material film, to form liquid films at desired positions. The liquid films are irradiated with an ultraviolet (UV) ray to be cured, to form a model material film and a support material film at desired positions. By repeating lamination of such layers, it is possible to form a three-dimensional object as illustrated in FIG. 2.

The support part of the thusly three-dimensionally formed object can be removed by the solvent liquid. In this way, a desired three-dimensional object (model part) can be obtained.

EXAMPLES

The present disclosure will be specifically described below by way of Examples. The present disclosure should not be construed as being limited to the Examples.

Viscosity measurement was performed in the manner described below.

<Viscosity>

Viscosity was measured with a rotational viscometer (VISCOMATE VM-150III, available from Toki Sangyo Co., Ltd.) at 25 degrees C.

Example 1

Acryloylmorpholine (available from KJ Chemicals Corporation) (50.0 parts by mass), 1,3-propanediol (available from Tokyo Chemical Industry Co., Ltd.) (50.0 parts by mass), 1-hydroxycyclohexylphenyl ketone (product name: IRGACURE 184, available from BASF Corporation) (3.0 parts by mass), and phenothiazine (available from Tokyo Chemical Industry Co., Ltd.) (0.1 parts by mass) were added together, stirred, and mixed, to obtain an active-energy-ray-curable liquid composition of Example 1.

Examples 2 to 28 and Comparative Examples 1 to 10

Active-energy-ray-curable liquid compositions of Examples 2 to 28 and Comparative Examples 1 to 10 were obtained in the same manner as in Example 1, except that the constitution of Example 1 was changed to the constitutions presented in Tables 1 to 9 below.

With each of the obtained active-energy-ray-curable liquid compositions, a "cured product (support part)" was formed in the manner described below, and removability (water decaying property) of the support part and the supporting power (compressive stress by 1% compression) of the support part were evaluated. The results are presented in Tables 1 to 9 below.

<Production of Cured Product (Support Part)>

The active-energy-ray-curable liquid composition was poured into a silicone rubber mold having a depth of 20 mm, a width of 20 mm, and a height of 5 mm, and irradiated with an ultraviolet ray in an irradiation amount of 500 mJ/cm$^2$ (with an illuminance of 100 mW/cm$^2$, for an irradiation time of 5 seconds) using an ultraviolet irradiator (apparatus name: SUBZERO-LED, available from Integration Technologies, Inc.). In this way, a support part, which was a cured product having a depth of 20 mm, a width of 20 mm, and a height of 5 mm was obtained.

(Removability (Water Decaying Property) of Support Part)

Removability (water decaying property) of the support part was evaluated in the manner described below based on at least one of "condition A-1", "condition A-2", and "condition B".

<Condition A-1 (40 Degrees C.)>

The silicone rubber mold in which the obtained support part having a depth of 20 mm, a width of 20 mm, and a height of 5 mm was formed was immersed in 40-degrees-C. hot water (20 mL), and ultrasonic waves (available from AS ONE Corporation, ASU-6) were applied to the silicone rubber mold for 30 minutes. Subsequently, the silicone rubber mold was taken out, and the support part remaining in the silicone rubber mold was visually observed, to evaluate "removability (water decaying property: condition A-1) of the support part" according to the evaluation criteria described below. The volume of the residual solid was measured by the Archimedean method.

—Evaluation Criteria—

A: The support part remained by less than 10% by volume.

B: The support part remained by 10% by volume or greater but less than 30% by volume.

C: The support part remained by greater than 30% by volume.

<Condition A-2 (60 Degrees C.)>

The silicone rubber mold in which the obtained support part having a depth of 20 mm, a width of 20 mm, and a height of 5 mm was formed was immersed in 60-degrees-C. hot water (20 mL), and ultrasonic waves (available from AS ONE Corporation, ASU-6) were applied to the silicone rubber mold for 30 minutes. Subsequently, the silicone rubber mold was taken out, and the support part remaining in the silicone rubber mold was visually observed, to evaluate "removability (water decaying property: condition A-2) of the support part" according to the evaluation criteria described below. The volume of the residual solid was measured by the Archimedean method.

—Evaluation Criteria—

A: The support part remained by less than 30% by volume.

B: The support part remained by 30% by volume or greater but 50% by volume or less.

C: The support part remained by greater than 50% by volume but 90% by volume or less.

D: The support part remained by greater than 90% by volume.

<Condition B>

The obtained support part having a depth of 20 mm, a width of 20 mm, and a height of 5 mm was immersed in water (20 mL) and left to stand still at 25 degrees C. for 1 hour. Subsequently, the silicone rubber mold was taken out, and the support part was visually observed, to evaluate "removability (water decaying property: condition B) of the support part" according to the evaluation criteria described below. The volume of the residual solid was measured by the Archimedean method.

—Evaluation Criteria—

A: The support part remained by less than 30% by volume.

B: The support part remained by 30% by volume or greater but less than 50% by volume.

C: The support part remained by 50% by volume or greater but 90% by volume or less.

D: The support part remained by greater than 90% by volume.

(Supporting Power of Support Part)

The supporting power of the support part was evaluated in the manners described below based on "height change rate" and "compressive stress by 1% compression".

<Height Change Rate>

The height of the obtained support part having a depth of 20 mm, a width of 20 mm, and a height of 5 mm immediately after cured and the height of the obtained support part after left to stand still at 40 degrees C. for 24 hours were measured, to calculate the height change rage. Next, "supporting power (height change rate) of the support part" was evaluated according to the evaluation criteria described below.

—Evaluation Criteria—

A: The height change rate was 1% or less.

B: The height change rate was greater than 1% but 5% or less.

C: The height change rate was greater than 5% but 10% or less.

D: The height change rate was greater than 10%.

<Compressive Stress by 1% Compression>

The obtained support part having a depth of 20 mm, a width of 20 mm, and a height of 5 mm was put in a 25-degrees-C. environment. A universal tester (apparatus name: AG-I, available from Shimadzu Corporation), a 1 kN load cell, and a compression jig for 1 kN were prepared. The support part formed as a shape having a depth of 20 mm, a width of 20 mm, and a height of 5 mm was set, and a stress responsive to a compression applied to the load cell was recorded by a computer, to plot stress vs. displacement, to measure compressive stress by 1% compression. "Supporting power (compressive stress by 1% compression) of the support part" was evaluated according to the evaluation criteria described below.

—Evaluation Criteria—

5: The compressive stress by 1% compression was 100 kPa or greater.

4: The compressive stress by 1% compression was 50 kPa or greater but less than 100 kPa 3: The compressive stress by 1% compression was 20 kPa or greater but less than 50 kPa.

2: The compressive stress by 1% compression was 5 kPa or greater but less than 20 kPa.

1: The compressive stress by 1% compression was 2 kPa or greater but less than 5 kPa.

0: The compressive stress by 1% compression was less than 2 kPa.

TABLE 1

| | | | Example | | | | | |
|---|---|---|---|---|---|---|---|---|
| | | | 1 | 2 | 3 | 4 | 5 | 6 |
| (A) Monomer having hydrogen-bonding capacity | Acryloylmorpholine | | 50.0 | 50.0 | 50.0 | 50.0 | 60.0 | 30.0 |
| | N-hydroxyethylacrylamide | | — | — | — | — | — | — |
| (B) Solvent-having hydrogen-bonding capacity | Diol containing 3 or more but 6 or less carbon atoms | 1,3-propanediol | 50.0 | — | — | — | — | — |
| | | 1,4-butanediol | — | 50.0 | — | — | — | — |
| | | 1,5-pentanediol | — | — | 50.0 | 25.0 | — | 70.0 |
| | | 1,6-hexanediol | — | — | — | 25.0 | 40.0 | — |
| | Monoalcohol containing 6 or more carbon atoms | 1-hexanol | — | — | — | — | — | — |
| | | 1-dodecanol | — | — | — | — | — | — |
| | Carboxylic acid compound | Butanoic acid | — | — | — | — | — | — |
| | | L-lactic acid | — | — | — | — | — | — |
| | Amine compound | Methylamine | — | — | — | — | — | — |
| | Ester compound | Dimethyl adipate | — | — | — | — | — | — |
| | Ketone compound | Acetylacetone | — | — | — | — | — | — |
| | Urea compound | Trimethylurea | — | — | — | — | — | — |
| (C) Hydrogen-bondable polymer | Polypropylene glycol (diol type, 400) | | — | — | — | — | — | — |
| Solvent | 1,2-ethanediol | | — | — | — | — | — | — |
| | 1,7-heptanediol | | — | — | — | — | — | — |
| | Ion-exchanged water | | — | — | — | — | — | — |
| Photo-polymerization initiator | 1-hydroxycyclohexylphenyl ketone | | 3.0 | 3.0 | 3.0 | 3.0 | 3.0 | 3.0 |
| Polymerization inhibitor | Phenothiazine | | 0.1 | 0.1 | 0.1 | 0.1 | 0.1 | 0.1 |
| Ratio by mass (A/B) | | | 1.0 | 1.0 | 1.0 | 1.0 | 1.5 | 0.4 |
| Viscosity (mPa · s) at 25 degrees C. | | | 23.0 | 28.0 | 30.0 | 50.0 | 80.0 | 24.0 |
| Evaluation result | (1) Removability (water decaying property) of support part | Condition A-1 (40 degrees C.) | | | | | | |
| | | Condition A-2 (60 degrees C.) | | | | | | |
| | | Condition B (25 degrees C., 1 hour) | A | A | A | B | B | A |
| | (2) Supporting power of support part | Height change rate | D | D | C | C | C | D |
| | | Compressive stress by 1% compression | 2 | 4 | 5 | 5 | 3 | 3 |

TABLE 2

|  |  |  | Example | | | | | |
| --- | --- | --- | --- | --- | --- | --- | --- | --- |
|  |  |  | 7 | 8 | 9 | 10 | 11 | 12 |
| (A) Monomer having hydrogen-bonding capacity | Acryloylmorpholine | | 40.0 | 55.0 | 20.0 | 55.0 | 50.0 | — |
|  | N-hydroxyethylacrylamide | | — | — | — | — | — | 50.0 |
| (B) Solvent having hydrogen-bonding capacity | Diol containing 3 or more but 6 or less carbon atoms | 1,3-propanediol | — | — | — | — | — | — |
|  |  | 1,4-butanediol | — | — | — | — | — | — |
|  |  | 1,5-pentanediol | 30.0 | — | — | — | — | — |
|  |  | 1,6-hexanediol | — | — | — | — | — | — |
|  | Monoalcohol containing 6 or more carbon atom | 1-hexanol | — | — | — | — | — | — |
|  |  | 1-dodecanol | — | — | — | — | — | — |
|  | Carboxylic acid compound | Butanoic acid | — | — | — | — | — | 20.0 |
|  |  | L-lactic acid | — | — | — | — | 30.0 | — |
|  | Amine compound | Methylamine | — | — | — | — | — | 20.0 |
|  | Ester compound | Dimethyl adipate | — | 22.0 | — | — | — | — |
|  | Ketone compound | Acetylacetone | — | — | 60.0 | — | — | — |
|  | Urea compound | Trimethylurea | — | — | — | 5.0 | — | — |
| (C) Hydrogen-bondable polymer | Polypropylene glycol (diol type, 400) | | 30.0 | 23.0 | 20.0 | 40.0 | 20.0 | 10.0 |
| Solvent | 1,2-ethanediol | | — | — | — | — | — | — |
|  | 1,7-heptanediol | | — | — | — | — | — | — |
|  | Ion-exchanged water | | — | — | — | — | — | — |
| Photo-polymerization initiator | 1-hydroxycyclohexylphenyl ketone | | 3.0 | 5.0 | 5.0 | 5.0 | 5.0 | 5.0 |
| Polymerization inhibitor | Phenothiazine | | 0.1 | 0.1 | 0.1 | 0.1 | 0.1 | 0.1 |
| Ratio by mass (A/B) | | | 1.3 | 2.5 | 0.3 | 11.0 | 1.7 | 1.3 |
| Viscosity (mPa · s) at 25 degrees C. | | | 50.0 | 70.0 | 70.0 | 100.0 | 80.0 | 50.0 |
| Evaluation result | (1) Removability (water decaying property) of support part | Condition A-1 (40 degrees C.) | — | — | — | — | — | — |
|  |  | Condition A-2 (60 degrees C.) | — | — | — | — | — | — |
|  |  | Condition B (25 degrees C., 1 hour) | A | B | A | B | A | B |
|  | (2) Supporting power of support part | Height change rate | C | D | D | D | D | D |
|  |  | Compressive stress by 1% compression | 5 | 5 | 1 | 5 | 5 | 0 |

TABLE 3

|  |  |  | Example | | |
| --- | --- | --- | --- | --- | --- |
|  |  |  | 13 | 14 | 15 |
| (A) Monomer having hydrogen-bonding capacity | Acryloylmorpholine | | 68.0 | 50.0 | 50.0 |
|  | N-hydroxyethylacrylamide | | — | — | — |
| (B) Solvent having hydrogen-bonding capacity | Diol containing 3 or more but 6 or less carbon atoms | 1,3-propanediol | — | — | — |
|  |  | 1,4-butanediol | — | — | — |
|  |  | 1,5-pentanediol | — | — | — |
|  |  | 1,6-hexanediol | — | — | — |
|  | Monoalcohol containing 6 or more carbon atoms | 1-hexanol | — | 50.0 | — |
|  |  | 1-dodecanol | — | — | 50.0 |
|  | Carboxylic acid compound | Butanoic acid | — | — | — |
|  |  | L-lactic acid | — | — | — |
|  | Amine compound | Methylamine | 25.0 | — | — |
|  | Ester compound | Dimethyl adipate | — | — | — |
|  | Ketone compound | Acetylacetone | — | — | — |
|  | Urea compound | Trimethylurea | — | — | — |
| (C) Hydrogen-bondable polymer | Polypropylene glycol (dial type, 400) | | 7.0 | — | — |
| Solvent | 1,2-ethanediol | | — | — | — |
|  | 1,7-heptanediol | | — | — | — |
|  | Ion-exchanged water | | — | — | — |

TABLE 3-continued

|  |  | Example | | |
|---|---|---|---|---|
|  |  | 13 | 14 | 15 |
| Photo-polymerization initiator | 1-hydroxcyclohexylphenyl ketone | 5.0 | 3.0 | 3.0 |
| Polymerization inhibitor | Phenothiazine | 0.1 | 0.1 | 0.1 |
| Ratio by mass (A/B) | | 2.7 | 1.0 | 1.0 |
| Viscosity (mPa · s) at 25 degrees C. | | 20.0 | 5.0 | 10.0 |
| Evaluation result | (1) Removability (water decaying property) of support part | Condition A-1 (40 degrees C.) | — | — | B |
| | | Condition A-2 (60 degrees C.) | — | — | A |
| | | Condition B (25 degrees C., 1 hour) | B | C | C |
| | (2) Supporting power of support part | Height change rate | D | C | B |
| | | Compressive stress by 1% compression | 5 | 4 | 4 |

TABLE 4

|  |  |  | Comparative Example | | | | |
|---|---|---|---|---|---|---|---|
|  |  |  | 1 | 2 | 3 | 4 | 5 |
| (A) Monomer having hydrogen-bonding capacity | Acryloylmorpholine | | 50.0 | 50.0 | 60.0 | 40.0 | 40.0 |
| | N-hydroxyethylacrylamide | | — | — | — | — | — |
| (B) Solvent having hydrogen-bonding capacity | Diol containing 3 or more but 6 or less carbon atoms | 1,3-propanediol | — | — | — | — | — |
| | | 1,4-butanediol | — | — | — | — | — |
| | | 1,5-pentanediol | — | — | — | — | — |
| | | 1,6-hexanediol | — | — | — | — | — |
| | Monoalcohol containing 6 or more carbon atoms | 1-hexanol | — | — | — | — | — |
| | | 1-dodecanol | — | — | — | — | — |
| | Carboxylic acid compound | Butanoic acid | — | — | — | — | — |
| | | L-lactic acid | — | — | — | — | — |
| | Amine compound | Methylamine | — | — | — | — | — |
| | Ester compound | Dimethyl adipate | — | — | — | — | — |
| | Ketone compound | Acetylacetone | — | — | — | — | — |
| | Urea compound | Trimethylurea | — | — | — | — | — |
| (C) Hydrogen-bondable polymer | Polypropylene glycol (diol type, 400) | | — | — | 10.0 | 60.0 | 60.0 |
| Solvent | 1,2-ethanediol | | 50.0 | — | — | — | — |
| | 1,7-heptanediol | | — | 50.0 | — | — | — |
| | Ion-exchanged water | | — | — | 30.0 | — | — |
| Photo-polymerization initiator | 1-hydroxycyclohexylphenyl ketone | | 3.0 | 3.0 | 5.0 | 5.0 | 5.0 |
| Polymerization inhibitor | Phenothiazine | | 0.1 | 0.1 | 0.1 | 0.1 | 1.2 |
| Ratio by mass (A/B) | | | — | — | — | — | — |
| Viscosity (mPa · s) at 25 degrees C. | | | 19.0 | Not dissolved | 40.0 | 60.0 | 60.0 |
| Evaluation result | (1) Removability (water decaying property) of support part | Condition A-1 (40 degrees C.) | — | — | — | — | — |
| | | Condition A-2 (60 degrees C.) | — | — | — | — | — |
| | | Condition B (25 degrees C., 1 hour) | A | D | A | D | A |
| | (2) Supporting power of support part | Height change rate | D | — | D | A | B |
| | | Compressive stress by 1% compression | 0 | 4 | 0 | 3 | 0 |

TABLE 5

| | | | Example | | | | | |
|---|---|---|---|---|---|---|---|---|
| | | | 16 | 17 | 18 | 19 | 20 | 21 |
| (A) Monomer having hydrogen-bonding capacity | Acryloylmorpholine | | 40.0 | 30.0 | 38.0 | 38.0 | 38.0 | 25.0 |
| | N-hydroxyethylacrylamide | | — | — | — | — | — | 25.0 |
| (B) Solvent having hydrogen-bonding capacity | Diol containing 3 or more but 6 or less carbon atoms | 1,5-pentanediol | 10.0 | — | — | — | — | — |
| | Monoalcohol containing 6 or more carbon atoms | 1-dodecanol | — | 40.0 | 34.0 | 34.0 | 34.0 | 25.0 |
| (C) Hydrogen-bondable polymer | Polypropylene glycol 1 (number average molecular weight: 1,000) | | 50.0 | 25.0 | — | — | 25.0 | — |
| | Polypropylene glycol 2 (number average molecular weight: 400) | | — | — | — | 25.0 | — | 25.0 |
| | Polypropylene glycol 3 (number average molecular weight: 200) | | — | — | 25.0 | — | — | — |
| | Polypropylene glycol monobutyl ether (number average molecular weight: 3,300) | | — | — | — | — | — | — |
| (D) Polyvalent alcohol having SP value of 30 MPa$^{1/2}$ or greater | Glycerin (SP value: 34.2 MPa$^{1/2}$) | | — | 5.0 | 4.0 | 4.0 | 4.0 | — |
| Photo-polymerization initiator | Bis(2,4,6-trimethylbenzoyl)-phenylphosphine oxide | | 2.0 | 2.0 | 2.0 | 2.0 | 2.0 | 2.0 |
| Polymerization inhibitor | Phenothiazine | | — | — | — | — | — | — |
| Ratio by mass (A/B) | | | 4.0 | 0.8 | 1.1 | 1.1 | 1.1 | 2.0 |
| Viscosity (mPa · s) at 25 degrees C. | | | 61.0 | 26.0 | 19.0 | 21.0 | 23.0 | 45.0 |
| Evaluation result | (1) Removability (water decaying property) of support part | Condition A-1 (40 degrees C.) | A | A | A | A | A | A |
| | | Condition A-2 (60 degrees C.) | — | — | — | — | — | — |
| | | Condition B (25 degrees C., 1 hour) | A | A | A | A | A | A |
| | (2) Supporting power of support part | Height change rate | A | B | C | B | A | B |
| | | Compressive stress by 1% compression | 5 | 3 | 4 | 4 | 4 | 1 |

TABLE 6

| | | | Example | | | | |
|---|---|---|---|---|---|---|---|
| | | | 22 | 23 | 24 | 25 | 26 |
| (A) Monomer having hydrogen-bonding capacity | Acryloylmorpholine | | 38.0 | 30.0 | 20.0 | 60.0 | 30.0 |
| | N-hydroxyethylacrylamide | | — | — | — | — | — |
| (B) Solvent having hydrogen-bonding capacity | Diol containing 3 or more but 6 or less carbon atoms | 1,5-pentanediol | — | — | — | 30.0 | — |
| | Monoalcohol containing 6 or more carbon atoms | 1-dodecanol | 34.0 | 54.0 | 40.0 | — | 63.0 |
| (C) Hydrogen-bondable polymer | Polypropylene glycol 1 (number average molecular weight; 1,000) | | — | 10.0 | 35.0 | 10.0 | — |
| | Polypropylene glycol 2 (number average molecular weight: 400) | | — | — | — | — | — |
| | Polypropylene glycol 3 (number average molecular weight: 200) | | — | — | — | — | — |
| | Polypropylene glycol mono butyl ether (number average molecular weight: 3,300) | | 25.0 | — | — | — | — |
| (D) Polyvalent alcohol having SP value of 30 MPa$^{1/2}$ or greater | Glycerin (SP value: 34.2 MPa$^{1/2}$) | | 4.0 | 6.0 | 5.0 | — | 7.0 |

TABLE 6-continued

|  |  |  | Example | | | | |
|---|---|---|---|---|---|---|---|
|  |  |  | 22 | 23 | 24 | 25 | 26 |
| Photo-polymerization initiator | Bis(2,4,6-trimethylbenzoyl)-phenylphosphine oxide | | 2.0 | 2.0 | 2.0 | 2.0 | 2.0 |
| Polymerization inhibitor | Phenothiazine | | — | — | — | — | — |
| Ratio by mass (A/B) | | | 1.1 | 0.6 | 0.5 | 2.0 | 0.5 |
| Viscosity (mPa · s) at 25 degrees C. | | | 38.0 | 19.0 | 38.0 | 25.0 | — |
| Evaluation result | (1) Removability (water decaying property) of support part | Condition A-1 (40 degrees C.) | A | A | A | A | B |
|  |  | Condition A-2 (60 degrees C.) | — | — | — | — | — |
|  |  | Condition B (25 degrees C., 1 hour) | A | A | A | A | B |
|  | (2) Supporting power of support part | Height change rate | A | C | C | C | B |
|  |  | Compressive stress by 1% compression | 4 | 3 | 1 | 5 | 3 |

TABLE 7

|  |  |  | Comparative Example | | |
|---|---|---|---|---|---|
|  |  |  | 6 | 7 | 8 |
| (A) Monomer having hydrogen-bonding capacity | Acryloylmorpholine | | 30.0 | 15.0 | 80.0 |
|  | N-hydroxyethylacrylamide | | — | — | — |
| (B) Solvent having hydrogen-bonding capacity | Diol containing 3 or more but 6 or less carbon atoms | 1,5-pentanediol | — | — | 20.0 |
|  | Monoalcohol containing 6 or more carbon atoms | 1-dodecanol | — | 85.0 | — |
| (C) Hydrogen-bondable polymer | Polypropylene glycol 1 (number average molecular weight: 1,000) | | 70.0 | — | — |
|  | Polypropylene glycol 2 (number average molecular weight: 400) | | — | — | — |
|  | Polypropylene glycol 3 (number average molecular weight: 200) | | — | — | — |
|  | Polypropylene glycol monobutyl ether (number average molecular weight: 3,300) | | — | — | — |
| (D) Polyvalent alcohol having SP value of 30 MPa$^{1/2}$ or greater | Glycerin (SP value: 34.2 MPa$^{1/2}$) | | — | — | — |
| Photo-polymerization initiator | Bis(2,4,6-trimethylbenzoyl)-phenylphosphine oxide | | 2.0 | 2.0 | 2.0 |
| Polymerization inhibitor | Phenothiazine | | — | — | — |
|  | Ratio by mass (A/B) | | — | 0.2 | 4.0 |
|  | Viscosity (mPa · s) at 25 degrees C. | | — | — | — |
| Evaluation result | (1) Removability (water decaying property) of support part | Condition A-1 (40 degrees C.) | B | A | C |
|  |  | Condition A-2 (60 degrees C.) | — | — | — |
|  |  | Condition B (25 degrees C., 1 hour) | D | A | D |
|  | (2) Supporting power of support part | Height change rate | A | D | A |
|  |  | Compressive stress by 1% compression | 3 | 0 | 4 |

TABLE 8

| | | | Example | |
|---|---|---|---|---|
| | | | 27 | 28 |
| (A) Monomer having hydrogen-bonding capacity | Acryloylmorpholine | | 36.0 | 24.0 |
| | N-hydroxyethylacrylamide | | — | 24.0 |
| (B) Solvent having hydrogen-bonding capacity | Monoalcohol containing 6 or more carbon atoms | 1-hexanol | — | — |
| | | 1-dodecanol | 36.0 | 48.0 |
| | | Cyclohexanol | — | — |
| | | Tripropylene glycol monomethyl ether | — | — |
| (D) Polyvalent alcohol having SP value of 30 MPa$^{1/2}$ or greater | Glycerin (SP value: 34.2 MPa$^{1/2}$) | | 24.0 | — |
| Solvent | 1-propanol | | — | — |
| Photo-polymerization initiator | 1-hydroxycyclohexylphenyl ketone | | 3.9 | 3.9 |
| Polymerization inhibitor | Phenothiazine | | 0.1 | 0.1 |
| | Ratio by mass (A/B) | | 1.0 | 1.0 |
| | Viscosity (mPa · s) at 25 degrees C. | | 24.5 | 30.3 |
| Evaluation result | (1) Removability (water decaying property) of support part | Condition A-1 (40 degrees C.) | — | — |
| | | Condition A-2 (60 degrees C.) | A | B |
| | | Condition B (25 degrees C., 1 hour) | A | B |
| | (2) Supporting power of support part | Height change rate | D | D |
| | | Compressive stress by 1% compression | 4 | 2 |

TABLE 9

| | | | Comparative Example | |
|---|---|---|---|---|
| | | | 9 | 10 |
| (A) Monomer having hydrogen-bonding capacity | Acryloylmorpholine | | 15.0 | 48.0 |
| | N-hydroxyethylacrylamide | | — | — |
| (B) Solvent having hydrogen-bonding capacity | Monoalcohol containing 6 or more carbon atoms | 1-hexanol | 82.0 | — |
| | | 1-dodecanol | — | — |
| | | Cyclohexanol | — | — |
| | | Tripropylene glycol monomethyl ether | — | — |
| (D) Polyvalent alcohol having SP value of 30 MPa$^{1/2}$ or greater | Glycerin (SP value: 34.2 MPa$^{1/2}$) | | — | — |
| Solvent | 1-propanol | | — | 48.0 |
| Photo-polymerization initiator | 1-hydroxycyclohexylphenyl ketone | | 2.9 | 3.9 |
| Polymerization inhibitor | Phenothiazine | | 0.1 | 0.1 |
| | Ratio by mass (A/B) | | 0.2 | — |
| | Viscosity(mPa · s) at 25 degrees C. | | 5.7 | 6.5 |
| Evaluation result | (1) Removability (water decaying property) of support part | Condition A-1 (40 degrees C.) | — | — |
| | | Condition A-2 (60 degrees C.) | B | A |
| | | Condition B (25 degrees C., 1 hour) | A | A |
| | (2) Supporting power of support part | Height change rate | D | D |
| | | Compressive stress by 1% compression | 0 | 0 |

Product names and supplier names of the components presented in Tables 1 to 9 are as follows.

Acryloylmorpholine: available from KJ Chemicals Corporation, molecular weight: 141.17

N-Hydroxyethylacrylamide: KJ Chemicals Corporation, molecular weight: 115.15

1,3-Propanediol: available from Tokyo Chemical Industry Co., Ltd.

1,4-Butanediol: available from Tokyo Chemical Industry Co., Ltd.

1,5-Pentanediol: available from Tokyo Chemical Industry Co., Ltd.

1,6-Hexanediol: available from Tokyo Chemical Industry Co., Ltd.

Butanoic acid: available from Tokyo Chemical Industry Co., Ltd.

L-Lactic acid: available from Tokyo Chemical Industry Co., Ltd.

Methylamine: available from Tokyo Chemical Industry Co., Ltd.

Dimethyl adipate: available from Tokyo Chemical Industry Co., Ltd.

Acetylacetone: available from Tokyo Chemical Industry Co., Ltd.

Trimethylurea: available from Tokyo Chemical Industry Co., Ltd.

1-Hexanol: available from Tokyo Chemical Industry Co., Ltd.

1-Dodecanol: available from Tokyo Chemical Industry Co., Ltd.

1,2-Ethanediol: available from Tokyo Chemical Industry Co., Ltd.

1,7-Heptanediol: available from Tokyo Chemical Industry Co., Ltd.

1-Hydroxycyclohexylphenyl ketone: available from BASF Corporation, product name: IRGACURE 184

Phenothiazine: available from Tokyo Chemical Industry Co., Ltd.

Polypropylene glycol (diol type, 400): available from Wako Pure Chemical Industries, Ltd.

Polypropylene glycol 1: available from Mitsui Chemicals & SKC Polyurethanes Inc., product name: ACTCOL D-1000, number average molecular weight: 1,000

Polypropylene glycol 2: available from Mitsui Chemicals & SKC Polyurethanes, Inc., product name: ACTCOL D-400, number average molecular weight: 400

Polypropylene glycol 3: available from Sanyo Chemical Industries, Ltd., product name: SANNIX PP-200, number average molecular weight: 200

Polypropylene glycol monobutyl ether: available from Asahi Glass Co., Ltd., product name: PREMINOL S 1004F, number average molecular weight: 3,300

Glycerin: available from Tokyo Chemical Industry Co., Ltd.

Bis(2,4,6-trimethylbenzoyl)-phenylphosphine oxide: available from BASF Corporation, product name: IRGACURE 819

1-Propanol: available from Tokyo Chemical Industry Co., Ltd.

Aspects of the present disclosure are as follows, for example.

<1> An active-energy-ray-curable liquid composition including:
a monomer (A) having a hydrogen-bonding capacity; and
a solvent (B) having a hydrogen-bonding capacity,
wherein the active-energy-ray-curable liquid composition satisfies conditions below,
<Conditions>
a cured product obtained by irradiating the active-energy-ray-curable liquid composition with 500 mJ/cm$^2$ of an active energy ray is a solid having a compressive stress of 2.0 kPa or greater when compressed by 1% at 25 degrees C., and the cured product has a water decaying property.

<2> An active-energy-ray-curable liquid composition including:
a monomer (A) having a hydrogen-bonding capacity; and
a solvent (B) having a hydrogen-bonding capacity,
wherein a cured product of the active-energy-ray-curable liquid composition has a water decaying property, and
wherein the solvent (B) having a hydrogen-bonding capacity is at least one selected from the group consisting of a diol containing 3 or more but 6 or less carbon atoms, a monoalcohol containing 6 or more carbon atoms, a cyclic alcohol containing 6 or more carbon atoms, and a polypropylene glycol monoether containing 6 or more carbon atoms.

<3> The active-energy-ray-curable liquid composition according to <2>, wherein a cured product obtained by irradiating the active-energy-ray-curable liquid composition with 500 mJ/cm$^2$ of an active energy ray is a solid having a compressive stress of 0.5 kPa or greater when compressed by 1% at 25 degrees C.

<4> The active-energy-ray-curable liquid composition according to any one of <1> to <3>,
wherein the active-energy-ray-curable liquid composition satisfies at least any one of a condition A to a condition C below as the water decaying property,
<Condition A>
when a cured product obtained by irradiating the active-energy-ray-curable liquid composition with 500 mJ/cm$^2$ of an active energy ray and having a depth of 20 mm, a width of 20 mm, and a height of 5 mm is immersed in 20 mL of water and subjected to ultrasonic application at a temperature of either 40 degrees C. or 60 degrees C. for 30 minutes, a residual solid has a volume of less than 30% by volume,
<Condition B>
when a cured product obtained by irradiating the active-energy-ray-curable liquid composition with 500 mJ/cm$^2$ of an active energy ray and having a depth of 20 mm, a width of 20 mm, and a height of 5 mm is immersed in 20 mL of water and left to stand still at 25 degrees C. for 1 hour, a residual solid has a volume of 90% by volume or less,
<Condition C>
when a cured product obtained by irradiating the active-energy-ray-curable liquid composition with 500 mJ/cm$^2$ of an active energy ray and having a depth of 20 mm, a width of 20 mm, and a height of 5 mm is immersed in 20 mL of water and left to stand still at 25 degrees C. for 1 hour, a residual solid has a size of 1 mm or less in at least one direction or the cured product is completely dissolved.

<5> The active-energy-ray-curable liquid composition according to any one of <1> to <4>,
wherein the active-energy-ray-curable liquid composition satisfies a condition below,
<Condition>
a cured product obtained by irradiating the active-energy-ray-curable liquid composition with 500 mJ/cm$^2$ of an active energy ray and having a depth of 20 mm, a width of 20 mm, and a height of 5 mm has a height change rate of 10% or less between a height of the cured product immediately after cured and a height of the cured product after left to stand still at 40 degrees C. for 24 hours.

<6> The active-energy-ray-curable liquid composition according to any one of <1> to <5>, further including
a hydrogen-bondable polymer (C).

<7> The active-energy-ray-curable liquid composition according to <6>,
wherein the hydrogen-bondable polymer (C) has a number average molecular weight of 400 or greater.

<8> The active-energy-ray-curable liquid composition according to any one of <1> to <7>,
wherein the solvent (B) having a hydrogen-bonding capacity is at least one selected from the group consisting of a diol containing 3 or more but 6 or less carbon atoms, a monoalcohol containing 6 or more carbon atoms, a cyclic alcohol containing 6 or more carbon atoms, a polypropylene glycol monoether containing 6 or more carbon atoms, a carboxylic acid compound, an amine compound, an ester compound, a ketone compound, and a urea compound.

<9> The active-energy-ray-curable liquid composition according to <8>,
wherein the solvent (B) having a hydrogen-bonding capacity is at least one selected from the group consisting of the diol containing 3 or more but 6 or less carbon atoms and the monoalcohol containing 6 or more carbon atoms.

<10> The active-energy-ray-curable liquid composition according to <9>,
wherein the diol containing 3 or more but 6 or less carbon atoms or the monoalcohol containing 6 or more carbon atoms is an alcohol having a SP value of 22 MPa$^{1/2}$ or less, and
wherein the active-energy-ray-curable liquid composition further includes a polyvalent alcohol (D) having a SP value of 30 MPa$^{1/2}$ or greater.

<11> The active-energy-ray-curable liquid composition according to any one of <1> to <10>,
wherein the monomer (A) having a hydrogen-bonding capacity is a monofunctional monomer, and
wherein the monofunctional monomer has a molecular weight of 100 or greater but 500 or less.

<12> The active-energy-ray-curable liquid composition according to <11>,
wherein the monomer (A) having a hydrogen-bonding capacity is at least any one of acryloylmorpholine and N-hydroxyethylacrylamide.

<13> The active-energy-ray-curable liquid composition according to any one of <1> to <12>,
wherein a ratio by mass (A/B) of a content (% by mass) of the monomer (A) to a content (% by mass) of the solvent (B) is 0.20 or greater but 2.5 or less.

<14> The active-energy-ray-curable liquid composition according to any one of <1> to <13>,
wherein a content of the monomer (A) is 30% by mass or greater but 60% by mass or less, and
wherein a content of the solvent (B) is 10% by mass or greater but 50% by mass or less.

<15> The active-energy-ray-curable liquid composition according to any one of <1> to <14>,
wherein the active-energy-ray-curable liquid composition has a viscosity of 100 mPa·s or less at 25 degrees C.

<16> A three-dimensional object forming material set including:
the active-energy-ray-curable liquid composition according to any one of <1> to <15>; and
an active-energy-ray-curable liquid composition that does not have a water decaying property.

<17> A method for producing a three-dimensional object, the method including producing a three-dimensional object with the active-energy-ray-curable liquid composition according to any one of <1> to <15>.

<18> A method for producing a three-dimensional object, the method including a liquid film forming step of forming a liquid film with a model material and the active-energy-ray-curable liquid composition according to any one of <1> to <15>; and
a curing step of curing the liquid film,
wherein the method repeats the liquid film forming step and the curing step to form a model part, which is a cured product of the model material, and a support part, which is a cured product of the active-energy-ray-curable liquid composition, and
wherein after forming the model part and the support part, the method removes the support part by water or water vapor.

<19> The method for producing a three-dimensional object according to <18>, wherein the liquid film forming step is performed by any one of an inkjet method and a dispenser method.

<20> A three-dimensional object producing apparatus including:
a container storing the active-energy-ray-curable liquid composition according to any one of <1> to <15>;
a liquid film forming unit configured to form a liquid film with the active-energy-ray-curable liquid composition; and
a curing unit configured to cure the liquid film.

The active-energy-ray-curable liquid composition according to any one of <1> to <15>, the three-dimensional object forming material set according to <16>, the method for producing a three-dimensional object according to any one of <17> to <19>, and the three-dimensional object producing apparatus according to <20> can solve the various problems in the related art and achieve the object of the present disclosure.

The invention claimed is:
1. An active-energy-ray-curable liquid composition comprising:
a monofunctional monomer (A) having a hydrogen-bonding capacity; and
a solvent (B) having a hydrogen-bonding capacity,
wherein the solvent (B) comprises at least one selected from the group consisting of a diol that comprises 3 or more but 6 or less carbon atoms, a monoalcohol that comprises 6 or more carbon atoms, a cyclic alcohol that comprises 6 or more carbon atoms, a polypropylene glycol monoether that comprises 6 or more carbon atoms, a carboxylic acid compound, an amine compound, an ester compound, a ketone compound, and a urea compound, and
wherein the active-energy-ray-curable liquid composition satisfies conditions below,
<Conditions>
a cured product obtained by irradiating the active-energy-ray-curable liquid composition with 500 mJ/cm$^2$ of an active energy ray is a solid having a compressive stress of 2.0 kPa or greater when compressed by 1% at 25 degrees C., and the cured product has a water decaying property.

2. An active-energy-ray-curable liquid composition comprising:
a monofunctional monomer (A) having a hydrogen-bonding capacity; and
a solvent (B) having a hydrogen-bonding capacity,
wherein a cured product of the active-energy-ray-curable liquid composition has a water decaying property,
wherein the solvent (B) comprises at least one selected from the group consisting of a diol that comprises 3 or more but 6 or less carbon atoms, a monoalcohol that comprises 6 or more carbon atoms, a cyclic alcohol that comprises 6 or more carbon atoms, a polypropylene glycol monoether that comprises 6 or more carbon atoms, a carboxylic acid compound, an amine compound, an ester compound, a ketone compound, and a urea compound, and
wherein a cured product obtained by irradiating the active-energy-ray-curable liquid composition with 500 mJ/cm$^2$ of an active energy ray is a solid having a compressive stress of 0.5 kPa or greater when compressed by 1% at 25 degrees C.

3. The active-energy-ray-curable liquid composition according to claim 1,
wherein the active-energy-ray-curable liquid composition satisfies at least any one of a condition A to a condition C below as the water decaying property,
<Condition A>
when a cured product obtained by irradiating the active-energy-ray-curable liquid composition with 500 mJ/cm$^2$ of an active energy ray and having a depth of 20 mm, a width of 20 mm, and a height of 5 mm is immersed in 20 mL of water and subjected to ultrasonic application at a temperature of either 40 degrees C. or 60 degrees C. for 30 minutes, a residual solid has a volume of less than 30% by volume,
<Condition B>
when a cured product obtained by irradiating the active-energy-ray-curable liquid composition with 500 mJ/cm$^2$ of an active energy ray and having a depth of 20 mm, a width of 20 mm, and a height of 5 mm is immersed in 20 mL of water and left to stand still at 25 degrees C. for 1 hour, a residual solid has a volume of 90% by volume or less,
<Condition C>
when a cured product obtained by irradiating the active-energy-ray-curable liquid composition with 500 mJ/cm$^2$ of an active energy ray and having a depth of 20 mm, a width of 20 mm, and a height of 5 mm is immersed in 20 mL of water and left to stand still at 25 degrees C. for 1 hour, a residual solid has a size of 1 mm or less in at least one direction or the cured product is completely dissolved.

4. The active-energy-ray-curable liquid composition according to claim 1,
wherein the active-energy-ray-curable liquid composition satisfies a condition below,
<Condition>
a cured product obtained by irradiating the active-energy-ray-curable liquid composition with 500 mJ/cm$^2$ of an active energy ray and having a depth of 20 mm, a width of 20 mm, and a height of 5 mm has a height change rate of 10% or less between a height of the cured product immediately after cured and a height of the cured product after left to stand still at 40 degrees C. for 24 hours.

5. The active-energy-ray-curable liquid composition according to claim 1, further comprising
a hydrogen-bondable polymer (C).

6. The active-energy-ray-curable liquid composition according to claim 5,
wherein the hydrogen-bondable polymer (C) has a number average molecular weight of 400 or greater.

7. The active-energy-ray-curable liquid composition according to claim 2,
wherein the solvent (B) comprises at least one selected from the group consisting of the diol that comprises 3 or more but 6 or less carbon atoms and the monoalcohol that comprises 6 or more carbon atoms.

8. The active-energy-ray-curable liquid composition according to claim 1,
wherein the solvent (B) comprises at least one selected from the group consisting of the diol that comprises 3 or more but 6 or less carbon atoms and the monoalcohol that comprises 6 or more carbon atoms.

9. The active-energy-ray-curable liquid composition according to claim 8,
wherein the diol that comprises 3 or more but 6 or less carbon atoms or the monoalcohol that comprises 6 or more carbon atoms comprises an alcohol having a SP value of 22 $MPa^{1/2}$ or less, and
wherein the active-energy-ray-curable liquid composition further comprises a polyvalent alcohol (D) having a SP value of 30 $MPa^{1/2}$ or greater.

10. The active-energy-ray-curable liquid composition according to claim 1,
wherein the monofunctional monomer (A) has a molecular weight of 100 or greater but 500 or less.

11. The active-energy-ray-curable liquid composition according to claim 10,
wherein the monofunctional monomer (A) comprises at least any one of acryloylmorpholine and N-hydroxyethylacrylamide.

12. The active-energy-ray-curable liquid composition according to claim 1,
wherein a ratio by mass (A/B) of a content (% by mass) of the monofunctional monomer (A) to a content (% by mass) of the solvent (B) is 0.20 or greater but 2.5 or less.

13. The active-energy-ray-curable liquid composition according to claim 1,
wherein a content of the monofunctional monomer (A) is 30% by mass or greater but 60% by mass or less, and
wherein a content of the solvent (B) is 10% by mass or greater but 50% by mass or less.

14. The active-energy-ray-curable liquid composition according to claim 1,
wherein the active-energy-ray-curable liquid composition has a viscosity of 100 mPa·s or less at 25 degrees C.

15. A three-dimensional object forming material set comprising:
an active-energy-ray-curable liquid composition that comprises
a monofunctional monomer (A) having a hydrogen-bonding capacity, and
a solvent (B) having a hydrogen-bonding capacity and comprising at least one selected from the group consisting of a diol that comprises 3 or more but 6 or less carbon atoms, a monoalcohol that comprises 6 or more carbon atoms, a cyclic alcohol that comprises 6 or more carbon atoms, a polypropylene glycol monoether that comprises 6 or more carbon atoms, a carboxylic acid compound, an amine compound, an ester compound, a ketone compound, and a urea compound,
wherein the active-energy-ray-curable liquid composition satisfies conditions below; and
an active-energy-ray-curable liquid composition that does not have a water decaying property,
<Conditions>
a cured product obtained by irradiating the active-energy-ray-curable liquid composition with 500 $mJ/cm^2$ of an active energy ray is a solid having a compressive stress of 2.0 kPa or greater when compressed by 1% at 25 degrees C., and the cured product has a water decaying property.

16. A method for producing a three-dimensional object, the method comprising
producing a three-dimensional object with the active-energy-ray-curable liquid composition according to claim 1.

17. A method for producing a three-dimensional object, the method comprising
forming a liquid film with a model material and an active-energy-ray-curable liquid composition that comprises a monofunctional monomer (A) having a hydrogen-bonding capacity and a solvent (B) having a hydrogen-bonding capacity and satisfies conditions below; and
curing the liquid film,
wherein the method repeats the forming and the curing to form a model part, which is a cured product of the model material, and a support part, which is a cured product of the active-energy-ray-curable liquid composition,
wherein after forming the model part and the support part, the method removes the support part by water or water vapor, and
wherein the solvent (B) comprises at least one selected from the group consisting of a diol that comprises 3 or more but 6 or less carbon atoms, a monoalcohol that comprises 6 or more carbon atoms, a cyclic alcohol that comprises 6 or more carbon atoms, a polypropylene glycol monoether that comprises 6 or more carbon atoms, a carboxylic acid compound, an amine compound, an ester compound, a ketone compound, and a urea compound,
<Conditions>
a cured product obtained by irradiating the active-energy-ray-curable liquid composition with 500 $mJ/cm^2$ of an active energy ray is a solid having a compressive stress of 2.0 kPa or greater when compressed by 1% at 25 degrees C., and the cured product has a water decaying property.

18. A three-dimensional object producing apparatus comprising:
a container storing the active-energy-ray-curable liquid composition according to claim 1;
a liquid film forming unit configured to form a liquid film with the active-energy-ray-curable liquid composition; and
a curing unit configured to cure the liquid film.

19. The active-energy-ray-curable liquid composition according to claim 1,
wherein a ratio by mass (A/B) of a content (% by mass) of the monofunctional monomer (A) to a content (% by mass) of the solvent (B) is 0.30 or greater but 2.5 or less.

20. The active-energy-ray-curable liquid composition according to claim 2,
wherein a ratio by mass (A/B) of a content (% by mass) of the monofunctional monomer (A) to a content (% by mass) of the solvent (B) is 0.30 or greater but 2.5 or less.

* * * * *